US 8,356,240 B2

(12) United States Patent
Takaku

(10) Patent No.: US 8,356,240 B2
(45) Date of Patent: Jan. 15, 2013

(54) DATA TRANSFERING APPARATUS

(75) Inventor: Kazuya Takaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 864 days.

(21) Appl. No.: 12/382,298

(22) Filed: Mar. 12, 2009

(65) Prior Publication Data

US 2009/0307568 A1 Dec. 10, 2009

(30) Foreign Application Priority Data

Jun. 4, 2008 (JP) .................................. 2008-147049

(51) Int. Cl.
G06F 11/10 (2006.01)
H03M 13/00 (2006.01)
(52) U.S. Cl. ....................................... 714/807; 714/776
(58) Field of Classification Search .................. 714/807, 714/776
See application file for complete search history.

(56) References Cited

U.S. PATENT DOCUMENTS

| 5,936,953 | A  | * | 8/1999 | Simmons ...................... 370/364 |
| 6,216,247 | B1 | * | 4/2001 | Creta et al. .................... 714/763 |
| 6,513,078 | B1 |   | 1/2003 | Kaganoi et al. |
| 2005/0058086 | A1 | | 3/2005 | Borkenhagen et al. |

FOREIGN PATENT DOCUMENTS

| EP | 0918289 | 5/1999 |
| JP | 5-250317 | 9/1993 |
| JP | 05-250317 A | 9/1993 |
| JP | 11-149444 | 6/1999 |
| WO | 2005/024633 A1 | 3/2005 |

OTHER PUBLICATIONS

European Search Report dated Aug. 12, 2010 issued in corresponding European Patent Application 09154898.2.
Japanese Office Action mailed Apr. 24, 2012 issued in corresponding Japanese Patent Application No. 2008-147049.
Second Chinese Office Action issued Aug. 22, 2012 in corresponding Chinese Patent Application No. 200910129277.3.

* cited by examiner

*Primary Examiner* — Guy Lamarre
(74) *Attorney, Agent, or Firm* — Staas & Halsey LLP

(57) ABSTRACT

An information processing apparatus includes a data transmitting apparatus that transmits data of an N-bit width; a data receiving apparatus that receives the data of the N-bit width from the data transmitting apparatus; and a data bus of the N-bit width connecting the data transmitting apparatus and the data receiving apparatus. The data transmitting apparatus includes a first error-detection-code-attached data generation circuit, a second error-detection-code-attached data generation circuit, a first degeneration correspondence register, and a transmission-side selection circuit. The data receiving apparatus includes a first error checking circuit, a second error checking circuit, and a second degeneration correspondence register.

16 Claims, 19 Drawing Sheets

FIG.2    RELATED ART 101c-1, 201c-1

| DROP SIGNAL | WIDTH | WIDTH SETTING SIGNAL | USE SEGMENT | ERROR-OCCURRING SEGMENT | TRANSMISSION-PATH STATE FLAG |
|---|---|---|---|---|---|
| - | NO DEGENERATION | A | a, b, c, d | - | 1 |
| 1 | 1/2 DEGENERATION | B | a, b | c | 0 |
| 2 | 1/2 DEGENERATION | B | a, b | d | 0 |
| 3 | 1/2 DEGENERATION | G | c, d | a | 0 |
| 4 | 1/2 DEGENERATION | G | c, d | b | 0 |
| 5 | 1/4 DEGENERATION | H | a | b, c | 0 |
| 6 | 1/4 DEGENERATION | H | a | b, d | 0 |
| 7 | 1/4 DEGENERATION | H | a | c, d | 0 |
| 8 | 1/4 DEGENERATION | I | b | a, c | 0 |
| 9 | 1/4 DEGENERATION | I | b | a, d | 0 |
| 10 | 1/4 DEGENERATION | I | b | c, d | 0 |
| 11 | 1/4 DEGENERATION | J | c | a, b | 0 |
| 12 | 1/4 DEGENERATION | J | c | a, d | 0 |
| 13 | 1/4 DEGENERATION | J | c | b, d | 0 |
| 14 | 1/4 DEGENERATION | K | d | a, b | 0 |
| 15 | 1/4 DEGENERATION | K | d | a, c | 0 |
| 16 | 1/4 DEGENERATION | K | d | b, c | 0 |

FIG.9

| DROP SIGNAL | WIDTH | WIDTH SETTING SIGNAL | USE SEGMENT | ERROR-OCCURRING SEGMENT | IDLE SEGMENT | TRANSMISSION-PATH STATE FLAG |
|---|---|---|---|---|---|---|
| - | NO DEGENERATION | A | a, b, c, d | - | - | 1 |
| 1 | 1/2 DEGENERATION | B | a, b | c | d | 0 |
| 2 | 1/2 DEGENERATION | B | a, b | d | c | 0 |
| 3 | 1/2 DEGENERATION | G | c, d | a | b | 0 |
| 4 | 1/2 DEGENERATION | G | c, d | b | a | 0 |
| 5 | 1/4 DEGENERATION | H | a | b, c | d | 0 |
| 6 | 1/4 DEGENERATION | H | a | b, d | c | 0 |
| 7 | 1/4 DEGENERATION | H | a | c, d | b | 0 |
| 8 | 1/4 DEGENERATION | I | b | a, c | d | 0 |
| 9 | 1/4 DEGENERATION | I | b | a, d | c | 0 |
| 10 | 1/4 DEGENERATION | I | b | c, d | a | 0 |
| 11 | 1/4 DEGENERATION | J | c | a, b | d | 0 |
| 12 | 1/4 DEGENERATION | J | c | a, d | b | 0 |
| 13 | 1/4 DEGENERATION | J | c | b, d | a | 0 |
| 14 | 1/4 DEGENERATION | K | d | a, b | c | 0 |
| 15 | 1/4 DEGENERATION | K | d | a, c | b | 0 |
| 16 | 1/4 DEGENERATION | K | d | b, c | a | 0 |

| DROP SIGNAL | WIDTH | BUS-WIDTH SETTING SIGNAL | USE SEGMENT | FAILED SEGMENT | IDLE SEGMENT |
|---|---|---|---|---|---|
| - | NO DEGENERATION | A | a, b, c, d | - | - |
| 1 | 1/2 DEGENERATION | B | a, b | c | d |
| 2 | 1/2 DEGENERATION | B | a, b | d | c |
| 3 | 1/2 DEGENERATION | G | c, d | a | b |
| 4 | 1/2 DEGENERATION | G | c, d | b | a |
| 5 | 1/4 DEGENERATION | H | a | b, c | d |
| 6 | 1/4 DEGENERATION | H | a | b, d | c |
| 7 | 1/4 DEGENERATION | H | a | c, d | b |
| 8 | 1/4 DEGENERATION | I | b | a, c | d |
| 9 | 1/4 DEGENERATION | I | b | a, d | c |
| 10 | 1/4 DEGENERATION | I | b | c, d | a |
| 11 | 1/4 DEGENERATION | J | c | a, b | d |
| 12 | 1/4 DEGENERATION | J | c | a, d | b |
| 13 | 1/4 DEGENERATION | J | c | b, d | a |
| 14 | 1/4 DEGENERATION | K | d | a, b | c |
| 15 | 1/4 DEGENERATION | K | d | a, c | b |
| 16 | 1/4 DEGENERATION | K | d | b, c | a |

| DROP SIGNAL | WIDTH | WIDTH SETTING SIGNAL | USE SEGMENT | FAILED SEGMENT | IDLE SEGMENT |
|---|---|---|---|---|---|
| - | NO DEGENERATION | A | a, b, c, d | - | - |

← → APPLIED PORTION

DATA TRANSFERING APPARATUS

CROSS-REFERENCE TO RELATED APPLICATION

This application is based upon and claims the benefit of priority of the prior Japanese Patent Application No. 2008-147049, filed on Jun. 4, 2008, the entire contents of which are incorporated herein by reference.

FIELD

The embodiments discussed herein are directed to a data transmitting apparatus that transmits data having an N-bit width (N is a positive integer), a data receiving apparatus that receives the data having the N-bit width from the data transmitting apparatus, an information processing apparatus including a data bus having an N-bit width that connects between the data transmitting apparatus and the data transmitting apparatus, a data transferring apparatus equivalent to the data transmitting apparatus and the data receiving apparatus, and a data transferring method in the information processing apparatus.

BACKGROUND

Conventionally, internal communications of an information processing apparatus and external communications between an information processing apparatus and another information processing apparatus are often achieved as parallel communication using a transmission path with $2^{\alpha}$ ($\alpha$ is a positive integer or 0) transmission lines to transmit data having a data width of $2^{\alpha}$ bits in a parallel manner, where $2^{\alpha}$ represents the $\alpha$-power of 2.

In such parallel communications, when a transmission error occurs in a transmission line, to ensure communication reliability, at least communication using that transmission line has to be suspended.

To achieve this, in a conventional technology, the transmission path in use is equally divided into two segments. The use of a segment including a transmission line where a transmission error occurred is stopped. The data width of the transmission path is divided into ½, and data transmission continues by using the other segment whose use is not stopped. With this, even if a transmission error occurs in a transmission line, the transmission path can be continuously used, while maintaining communication reliability.

Such a conventional technology is disclosed in, for example, Japanese Laid-open Patent Publication No. 05-250317.

However, in the conventional technology, every time a transmission error occurs in a transmission line of the transmission path in use, the data width of the transmission path including a segment where no error occurs is excessively degenerated to ½.

Moreover, every time a transmission error occurs in a transmission line, the transmission speed of the transmission path is further decreased to ½. A decrease in transmission speed leads to a decrease in throughput of the information processing apparatus, thereby inviting an unwanted stay of transmission data and a delay in transmission of data to be transmitted with the highest priority.

SUMMARY

According to an aspect of the invention, an information processing apparatus includes a data transmitting apparatus that transmits data of an N-bit width, where N is a positive integer; a data receiving apparatus that receives the data of the N-bit width from the data transmitting apparatus; and a data bus of the N-bit width connecting the data transmitting apparatus and the data receiving apparatus.

The data transmitting apparatus includes: a first error-detection-code-attached data generation circuit that generates, for first data of an X-bit width, where X is a positive integer satisfying X<N, from among the data of the N-bit width, first error-detection-code-attached data provided with an error detection code for detecting a data transmission error by the data receiving apparatus; a second error-detection-code-attached data generation circuit that generates, for second data of an (N-X)-bit width from among the data of the N-bit width, second error-detection-code-attached data provided with an error detection code for detecting a data transmission error by the data receiving apparatus; a first degeneration correspondence register that records therein an error occurring position in the data bus, based on a first or second error notifying signal from the data receiving apparatus; and a transmission-side selection circuit that selects either one of a first data bus of an X-bit width and a second data bus of an (N-X)-bit width of the data bus of the N-bit width, based on a data degeneration notifying signal to output the first and second error-detection-code-attached data, and selects either bits of the first and second data buses in another data bus not selected from among the first and second data buses, based on a usable bit position notifying signal based on recorded contents of the first degeneration correspondence register to output third data different from the first and second error-detection-code-attached data.

The data receiving apparatus includes: a first error checking circuit that detects an error in the first error-detection-code-attached data and outputs the first error notifying signal when having detected an error; a second error checking circuit that detects an error in the second error-detection-code-attached data and outputs the second error notifying signal when having detected the error; and a second degeneration correspondence register that records therein an error occurring position in the data of the N-bit width based on the first or second error notifying signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a drawing of an example of a degeneration correspondence table;

FIG. 9 is a drawing of one example of a degeneration correspondence table according to the exemplary first embodiment;

FIG. 17 is a drawing of one example of a degeneration correspondence table according to the exemplary second embodiment;

FIG. 18 is a drawing of an example of the degeneration correspondence table according to the exemplary second embodiment.

DESCRIPTION OF EMBODIMENTS

Preferred embodiments of the present invention will be explained with reference to the accompanying drawings. The embodiments of the information processing apparatus, data transferring apparatus, and data transferring method according to the present invention are explained in detail below. It is assumed in the following exemplary embodiments that the data transferring apparatus is a circuit in the information processing apparatus for parallel communication with its counterpart circuit.

However, the present invention is not meant to be restricted to the exemplary embodiments. The information processing apparatus, data transferring apparatus, and data transferring method disclosed herein can be applied to any communication apparatus as long as the communication apparatus is such that, when data with error check data is transmitted to a counterpart communication apparatus through parallel communication and a data communication error is detected in the counterpart communication apparatus, the communication apparatus performs data communication of degenerating a segment of a transmission path including a transmission line where the communication error occurred.

In the following, it is assumed that "transmission data" contains at least one packet.

Figure 1:
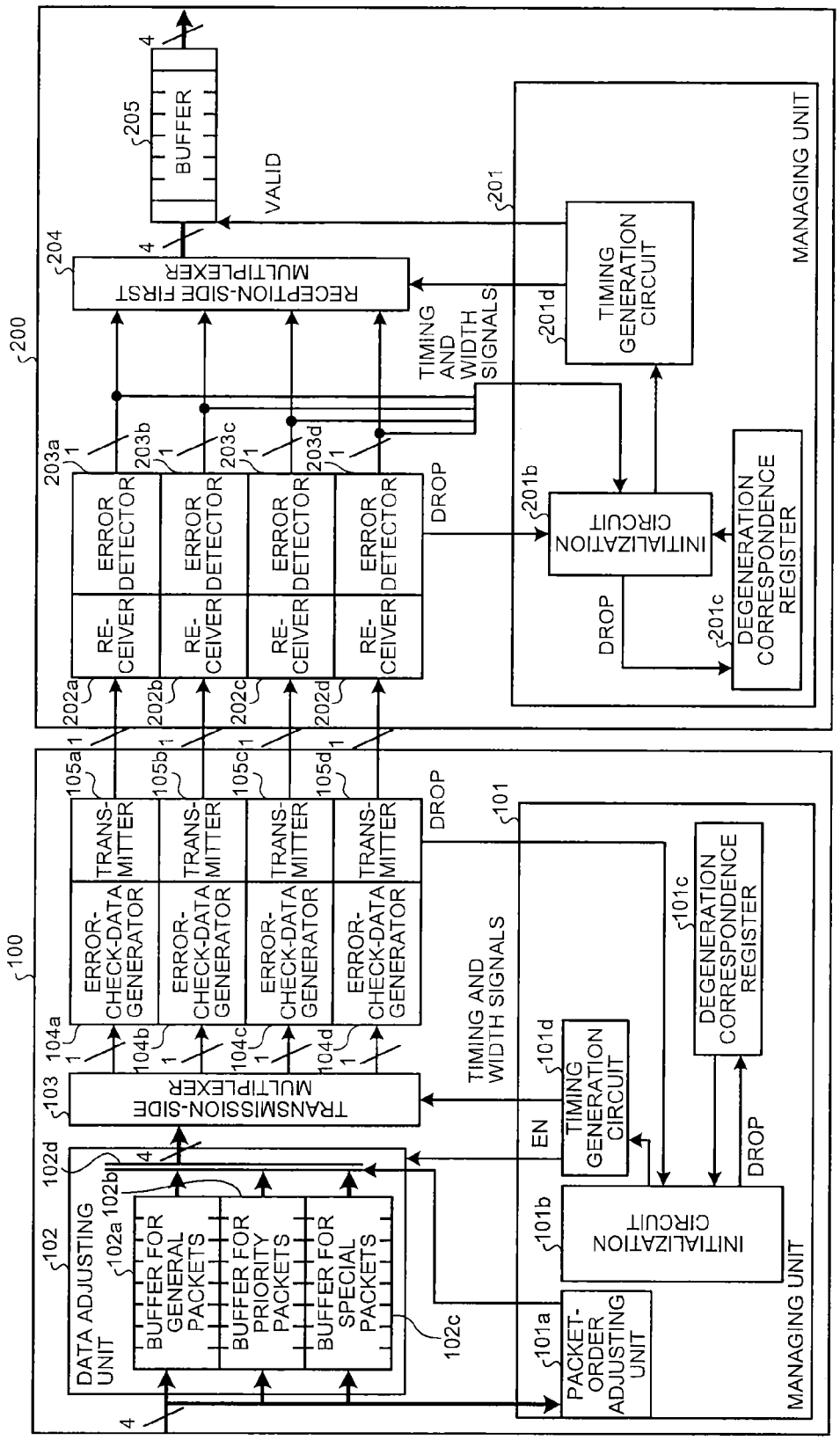
FIG. 1 is a block diagram of the configuration of a conventional data transferring apparatus.

Prior to explanation of the exemplary embodiments, the configuration of a conventional data transferring apparatus serving as a premise for the data transmission apparatus according to the exemplary embodiments is explained. FIG. 1 is a block diagram of the configuration of the conventional data transferring apparatus. In general, four segments are provided to a data transferring apparatus 100 as communication interfaces, each having a data width of $2^4$ (=16) bits, for example.

With four segments, the data transferring apparatus 100 can transmit and receive data having a data width of 16×4 (=64) bits at maximum via the communication interfaces.

However, in an exemplary embodiment, for simplification of explanation, it is assumed that each segment has a data width of 1 bit. Also, since the transmission path has four segments, the transmission path has a data width of 4 bits.

In the drawing, for simplification of explanation, it is assumed that data transferring apparatuses mutually serving as counterparts are the data transferring apparatus 100 on a transmission side (hereinafter, also referred to as a transmission-side data transferring apparatus 100) and a reception-side data transferring apparatus. For the transmission-side data transferring apparatus 100, only transmission functions are depicted. For the reception-side data transferring apparatus 200, only reception functions are depicted.

Also, in FIG. 1, a line with "1" is a transmission path having a 1-bit width, a line with "4" is a transmission path of 4 bits with four transmission lines each having a 1-bit with. The same goes for FIGS. 8 and 16.

The transmission-side data transferring apparatus 100 includes a managing unit 101 that controls the entire apparatus, a data adjusting unit 102 that adjusts a transmission order according to priority of transmission data, a transmission-side multiplexer 103 that adjusts a data width of the transmission data (the number of bits of the transmission data for parallel transmission) according to a data-degeneration notifying signal, which will be explained further below.

The transmission-side multiplexer 103 makes an adjustment according to a bus width of the transmission path (for example, the bus width becomes ½ due to degeneration) according to the state of the transmission path (for example, a degeneration state of the transmission path), and also selects a non-degenerated transmission line as a transmission path for transmitting transmission data.

Also, in the transmission-side multiplexer 103, error-check-data generators 104a to 104d are connected corresponding to four segments, providing error check data to transmission data before data transmission. Error check data herein is, for example, Cyclic Redundancy Check (CRC) data or parity-check data only for error detection. Alternatively, the error check code may be Error Correcting Code (ECC) for error correction together with error detection, such as Hamming code.

Each piece of transmission data provided with error check data by a relevant one of the error-check-data generators 104a to 104d is transmitted by a relevant one of transmitters 105a to 105d to the counterpart data transferring apparatus 200.

The managing unit 101 includes a packet-order adjusting unit 101a, an initialization circuit 101b, a degeneration correspondence register 101c implemented by a non-volatile memory, and a timing generation circuit 101d. The packet-order adjusting unit 101a determines the packet type of data input to the data transferring apparatus 100 as transmission data, and performs control so as to cause the data adjusting unit 102 to select transmission data according to the determined priority order for output to the transmission-side multiplexer 103.

With the transmitters 105a to 105d detecting a voltage operation in a segment where an error occurred by an initialization circuit 201b of the data transferring apparatus 200, the initialization circuit 101 recognizes the segment including the transmission line where the error occurred.

Upon detecting a change in voltage in a segment, the transmitters 105a to 105d output an error notifying signal capable of specifying the segment to be degenerated (hereinafter, abbreviated as "drop") to the initialization circuit 101b.

The initialization circuit 101b records the segment of the transmission path where the transmission error occurred in a degeneration correspondence table 101-c (refer to FIG. 2), which will explained further below, stored in the degeneration correspondence register 101c.

Here, drop contains identification information of all degeneration patterns of the transmission path covered by a degeneration correspondence table 101c-1. By referring to the degeneration correspondence table 101c-1 based on this identification information, a segment where a transmission error occurred and a segment to be degenerated are specified.

The initialization circuit 101b instructs the timing generation circuit 101d to output an EN signal (hereinafter, abbreviated as "EN" to the data adjusting unit 102 according to degeneration control over the segment to be degenerated specified by referring to the degeneration correspondence table 101c-1 based on the identification information of drop. EN is a signal allowing the data adjusting unit 102 to output a packet to the transmission-side multiplexer 103.

Also, the initialization circuit 101b instructs the timing generation circuit 101d to output timing and width signals to the transmission-side multiplexer 103 for degeneration control over the segment to be degenerated specified by referring to the degeneration correspondence table 101c-1 based on the identification information of drop.

Furthermore, the initialization circuit 101b performs an initializing process on the degenerated segment. When this initializing process is successful, degeneration of that segment is cancelled.

The data adjusting unit 102 includes buffers that store an input packet according to its type (a buffer for general packets 102a, a buffer for priority packets 102b, and a buffer for special packets 102c) and a selector 102d that selects a packet with the highest priority from the buffer for general packets 102a, the buffer for priority packets 102b, and the buffer for special packets 102c according to priority control by the packet-order adjusting unit 101a and outputs the selected packet to the transmission-side multiplexer 103.

The reception-side data transferring apparatus 200 includes a managing unit 201 that controls the entire apparatus, and receivers 202a to 202d that receive transmission data transmitted from the transmitters 105a to 105d of the data transferring apparatus 100.

Also, the data transferring apparatus 200 includes error detectors 203a to 203d that detect an error in transmission data received by the receivers 202a to 202d based on error check data provided to the transmission data.

Furthermore, the data transferring apparatus 200 includes a reception-side first multiplexer 204 that adjusts the data width of transmission data output from the error detectors 203a to 203d for output to a buffer 205, and the buffer 205 that temporarily accumulates the transmission data input by the reception-side first multiplexer 204 until all packets arrive, thereby providing an output timing.

The managing unit 201 includes the initialization circuit 201b, a degeneration correspondence register 201c, and a timing generation circuit 201d.

Also, the initialization circuit 201b records a segment of a transmission path where a transmission error occurred in a degeneration correspondence table 201c-1, which will be explained further below, (refer to FIG. 2) stored in the degeneration correspondence register 201c based on drop from the error detectors 203a to 203d.

Furthermore, the initialization circuit 201b records in the degeneration correspondence register 201c a segment to be degenerated specified by referring to the degeneration correspondence table 201c-1 based on identification information of drop.

Still further, the initialization circuit 201b instructs the timing generation circuit 201d to output timing and width signals to the reception-side first multiplexer 204 so as to perform degeneration control over the segment to be degenerated specified by referring to the degeneration correspondence table 201c-1 based on the identification information of drop.

Still further, the initialization circuit 201b instructs the timing generation circuit 201d to output a Valid signal (hereinafter, abbreviated as "Valid") to the buffer 205 according to the degeneration control over the segment to be degenerated specified by referring to the degeneration correspondence table 201c-1 based on the identification information of drop. Valid is a signal that provides the buffer 205 with a timing for canceling degeneration of the data width of a plurality of input packets from the reception-side first multiplexer 204.

Next, the degeneration correspondence table of the data transferring apparatus is explained. FIG. 2 is a drawing of an example of the degeneration correspondence table. The degeneration correspondence table 101c-1 covers all degeneration control patterns. As depicted in the drawing, the degeneration correspondence table includes columns of "drop signal", "width", "width setting signal", "use segment", "error-occurring segment", and "transmission-path state flag".

"Drop signal" represents a value of the drop signal indicative of identification information for identifying a degeneration state of the transmission path. For example, when "drop signal" indicates "1", this means that "width" is "½ degeneration", "width setting signal" is "B", "use segment" is "a, b", and "error-occurring segment" is "c".

"Width" represents a degeneration width of the transmission path. In the exemplary first embodiment, there are ½ degeneration from the data width of the transmission path in a state without errors, and ¼ degeneration further degenerated by ½. In "width", "no degeneration", "½ degeneration", or "¼ degeneration" is stored, indicating the state of the data width of the transmission path.

"Width setting signal" indicates identification information provided according to the segment continuously usable after degeneration of the transmission path. For example, when "width setting signal" indicates "B", "use segment" is "a, b".

"Use segment" represents a segment continuously usable after degeneration control over the transmission path due to the occurrence of an error. "Error-occurring segment" represents a segment in which an occurrence of a transmission error is detected.

Also, "transmission-path state flag" is a flag indicative of the state of degeneration control performed based on EN from the reception-side data transferring apparatus 200. Always, only one entry in the degeneration correspondence table can have a "transmission-path state flag" indicative of "1 (ON)". With this "transmission-path state flag", the error-occurring segment can be recorded.

In addition, with this "transmission-path state flag", the state of degeneration control over the transmission path can be specified. In the state where no transmission error is detected and no degeneration control over the transmission path is performed, "transmission-path state flag" of an entry with "-" in "drop signal" indicates "1". Here, the degeneration correspondence register 201c of the reception-side data transferring apparatus 200 also has stored therein the degeneration correspondence table 201c-1 similar to the degeneration correspondence table 101c-1.

Figure 3:
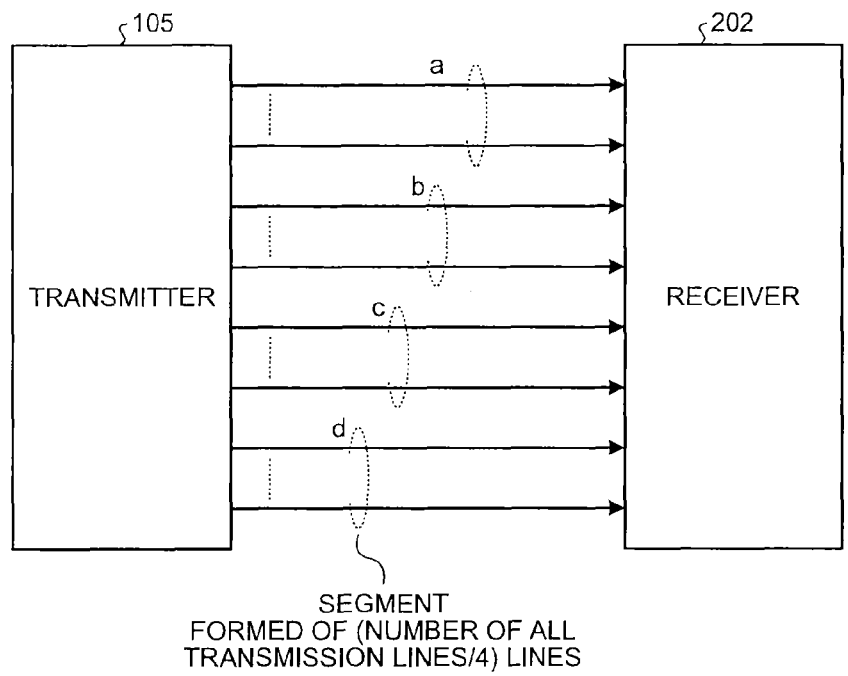
FIG. 3 is a drawing for explaining segments of a data transmission path.

Next, segments of a data transmission path are explained. FIG. 3 is a drawing for explaining segments of a data transmission path. Each segment is formed by combining (the number of all transmission lines)/4 adjacent transmission lines. Note that FIG. 1 depicts the segment configured of one line.

As depicted in FIG. 3, a transmission path from the transmitters 105 (transmitters 105a to 105d) to the receivers 202 (receivers 202a to 202d) is formed of four segments "a", "b", "c", and "d".

The segment "a" is a transmission path from the transmitter 105a to the receiver 202a. The segment "b" is a transmission path from the transmitter 105b to the receiver 202b. The segment "c" is a transmission path from the transmitter 105c to the receiver 202c. The segment "d" is a transmission path from the transmitter 105d to the receiver 202d.

Degeneration control over a data transmission path is performed by taking the segments "a" and "b" as one set and the segments "c" and "d" as one set. For example, in "½ degeneration", when a transmission error occurs in one of the segments "a", "b", "c", and "d", all segments in the set including the segment where the error occurs is not allowed to be used, and the other set of the segments is used as a data transmission path after degeneration control.

Figure 4:
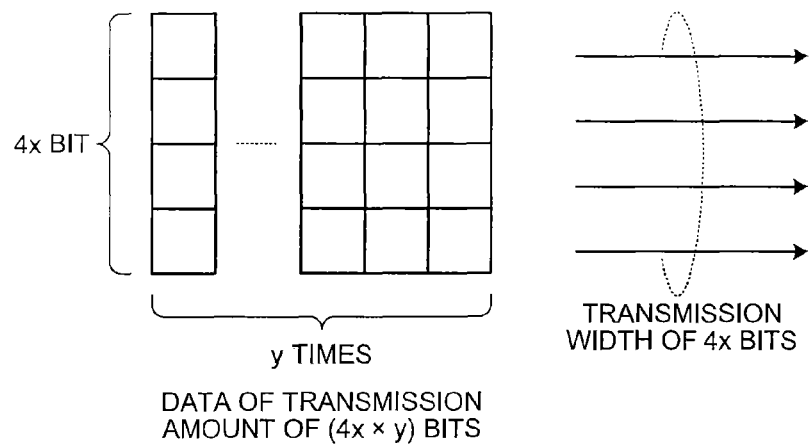
FIG. 4 is a drawing that depicts a relation between a data transmission width and transmission data.

Next, a relation between the data transmission width and transmission data is explained. FIG. 4 is a drawing that depicts the relation between the data transmission width and the transmission data. As depicted in the drawing, the data transferring apparatus 100 and the data transferring apparatus 200 configured so that 4x transmitters and 4x receivers face each other have a transmission line having a 4x-bit width, capable of transmitting information of (4x×y) bits.

Figure 5:
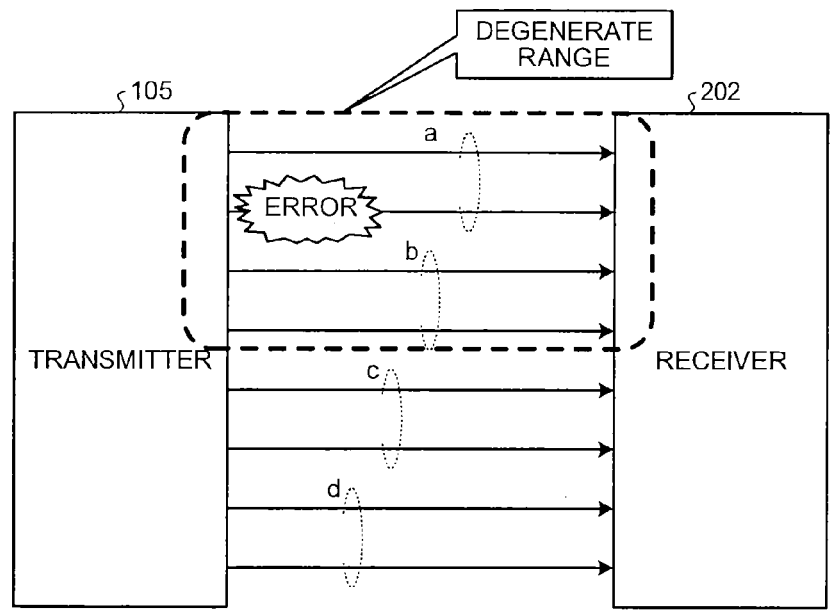
FIG. 5 is a drawing for explaining a degenerate range of a data transmission path when a data transmission error occurs in the conventional data transferring apparatus.

Next, a degenerate range of a data transmission path when a data transmission error occurs in the conventional data transferring apparatus is explained. FIG. 5 is a drawing for explaining the degenerate range of the data transmission path when a data transmission error occurs in the conventional data transferring apparatus.

As depicted in FIG. 5, the transmission line where a transmission error is detected is to be degenerated, and the range of degeneration is determined in units of segment including that transmission line. The transmitters 105 use the transmission path to transmit error-detectable error check data to the reception-side error detectors 203a to 203d.

When the transmission path has a failure and a transmission error is detected by any of the reception-side error detectors 203a to 203d, degeneration information is set with drop in the degeneration correspondence table 201c-1 of the degeneration correspondence register 201c, thereby resetting the data transferring apparatus 100 and the data transferring apparatus 200.

At initialization, to notifying the transmission-side transferring apparatus the degeneration state of the transmission path, the reception-side data transferring apparatus 200 operates the voltage of the transmission path. Any of the transmitters 105 detecting a change in lane voltage sets degeneration information in the degeneration correspondence table 101c-1 of the degeneration correspondence register 101c through the initialization circuit.

For easy handling of information to be transmitted, it is assumed that the degeneration range is set within $1/(2n)$ ($n=1, 2, \ldots$), such as the entire width to a ½ width of the transmission line and the ½ width to a ¼ width.

Figure 6:
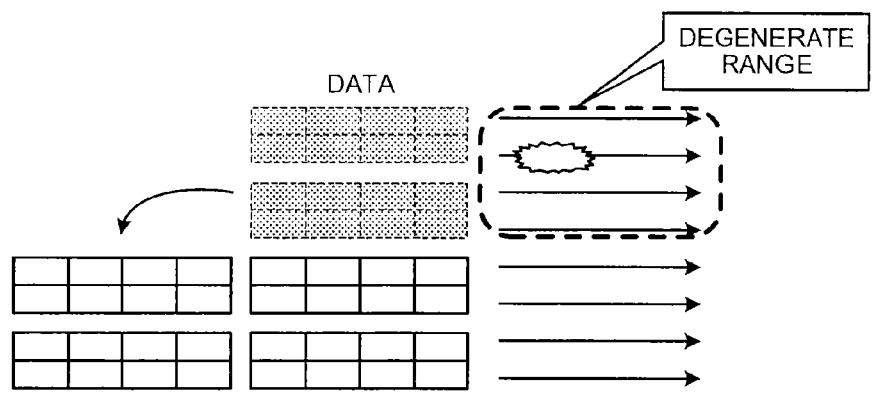
FIG. 6 is a drawing for explaining a data transmission state when a data transmission error occurs in the conventional data transferring apparatus.

Next, a data transmission state when a data transmission error occurs in the conventional data transferring apparatus is explained. FIG. 6 is a drawing for explaining a data transmission state when a data transmission error occurs in the conventional data transferring apparatus. As depicted in the drawing, information supposed to be sent through the degenerated transmission line is incorporated in a time-division manner into information on a usable transmission path side and is then sent.

Figure 7A:
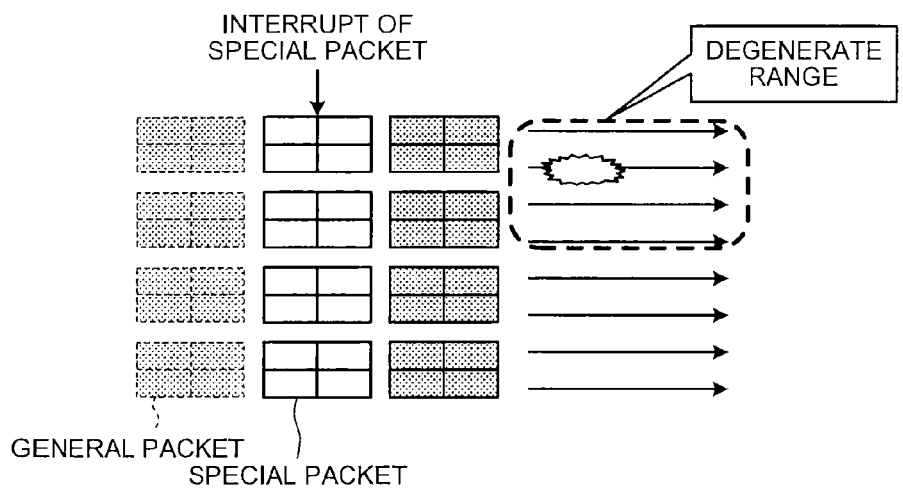
FIG. 7A is a drawing for explaining a transmission state of a special packet when a data transmission path has no degeneration in the conventional data transferring apparatus.

Next, a transmission state of a special packet when a data transmission path has no degeneration in the conventional data transferring apparatus is explained. FIG. 7A is a drawing for explaining a transmission state of a special packet when a data transmission path has no degeneration in the conventional data transferring apparatus. The special packet includes debug information and apparatus configuration, for example. As depicted in FIG. 7A, the special packet is a packet with a higher transmission priority than that of a general packet, capable of being sent by interrupting the general packet.

Figure 7B:
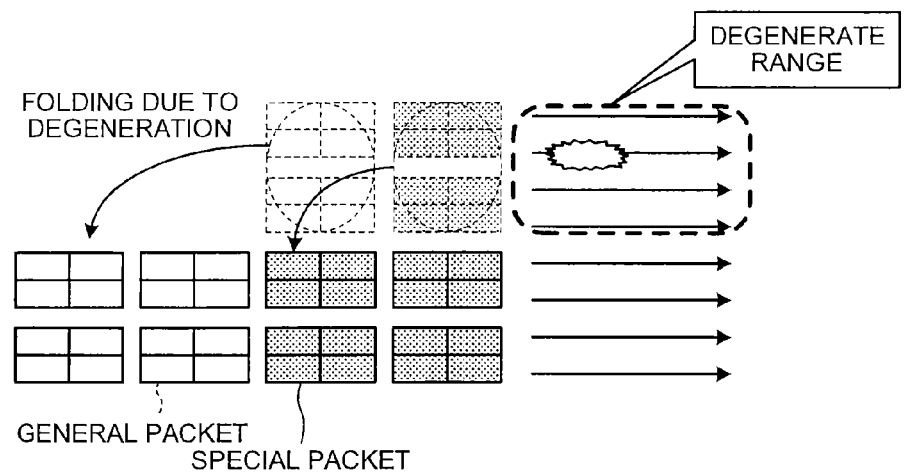
FIG. 7B is a drawing for explaining a transmission state of a special packet when a data transmission path has degeneration in the conventional data transferring apparatus.

Next, a transmission state of a special packet when a data transmission path has degeneration in the conventional data transferring apparatus is explained. FIG. 7B is a drawing for explaining a transmission state of a special packet when a data transmission path has degeneration in the conventional data transferring apparatus.

As is evident with reference to FIGS. 7A and 7B, when the transmission band is decreased due to degeneration caused by a failure in a transmission line, it takes time until information having a plurality of packets is completely transmitted. Therefore, in the case of many special packets, as depicted in FIG. 7B, a delay in transmission time of a general packet becomes significant.

Moreover, similarly, a packet with a lower priority, such as a debug packet, is disadvantageously not sent and stays for a long time in the case of many other packets with higher priorities at degeneration of a transmission line.

Furthermore, in the conventional data transferring apparatus, when a failure occurs in a transmission path, degeneration is performed in configuration units of 1/(2n) fold to separate the failed portion. With this, the configuration of the degeneration control circuit and data transfer control circuit can be simplified.

However, even a transmission path where no failure occurs is degenerated to lead to an excessive degeneration, thereby not utilizing a usable transmission path. This decreases the usable band, disadvantageously causing a strain on necessary information transfer.

[Exemplary First Embodiment]

Figure 8:
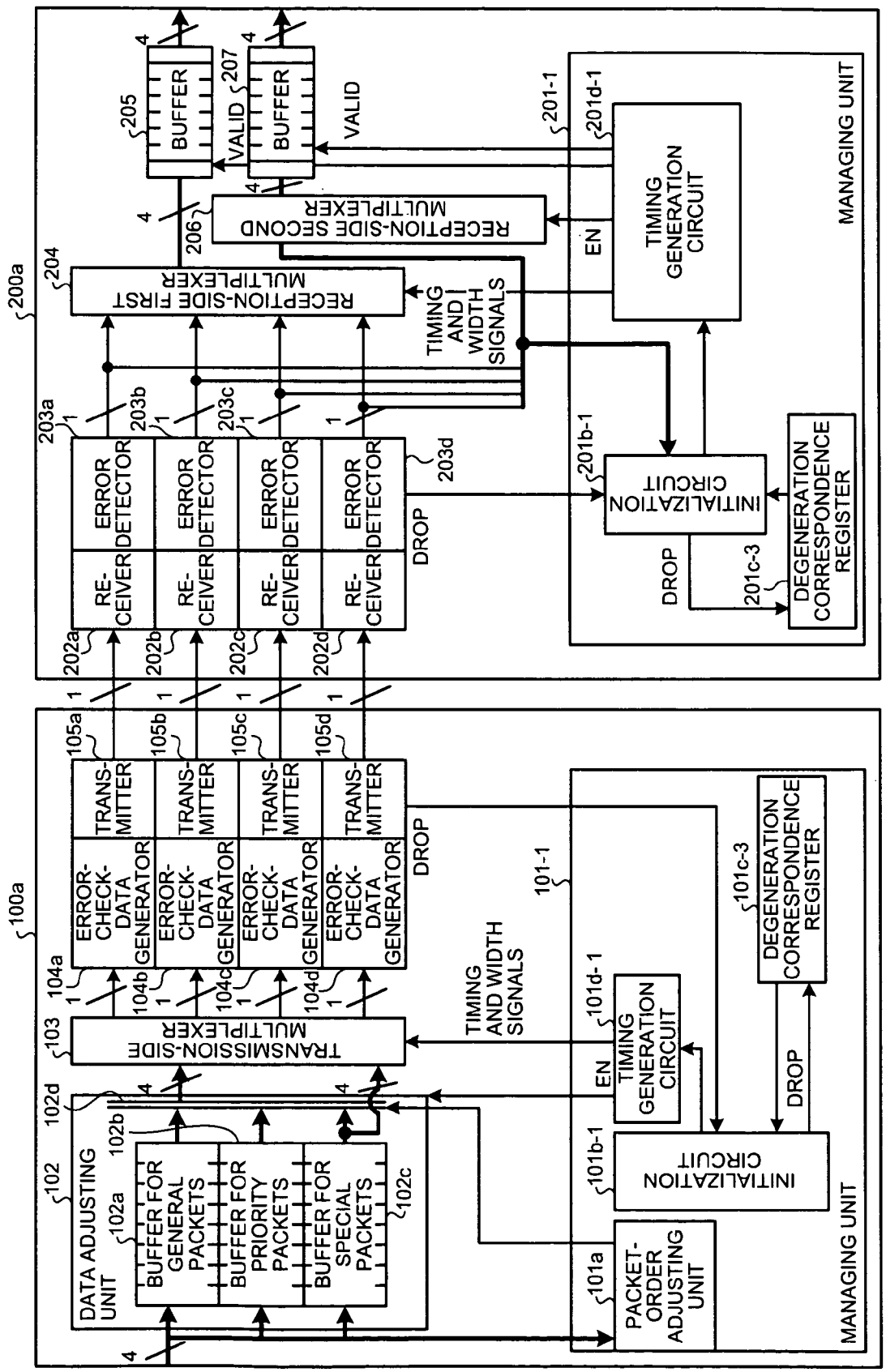
FIG. 8 is a block diagram of the configuration of a data transferring apparatus according to an exemplary first embodiment.

First, the configuration of a data transferring apparatus according to an exemplary first embodiment is explained. FIG. 8 is a block diagram of the configuration of the data transferring apparatus according to the exemplary first embodiment. A data transferring apparatus 100a (200a) according to the exemplary first embodiment further records a correspondence between a degenerate transmission path and an idle segment in the degeneration correspondence table 101c-1 (201c-1) stored in a degeneration correspondence register 101c-3 (201c-3) of a managing unit 101-1 (201-1) on transmission and reception sides of the conventional data transferring apparatus 100 (200).

The transmission-side multiplexer 103 has connected thereto a route allowing a special packet to be transmitted by bypassing the selector 102d. The reception-side data transferring apparatus 200a has connected thereto a route allowing packets of transmission data received by the receiver 202a to 202d to be received by bypassing the reception-side first multiplexer 204. In the course of this route, a reception-side second multiplexer 206 that converts the data width of the reception data is provided.

At the stage after the reception-side second multiplexer 206, a buffer 207 is connected that temporarily accumulates data input from the reception-side second multiplexer 206 until all packets arrive to provide an output timing.

Compared with the timing generation circuit 101d and the timing generation circuit 201d, a timing generation circuit 101d-1 and a timing generation circuit 201d-1 are further provided with a control function of using an idle segment referred to in a degeneration correspondence table 101c-2 and a degeneration correspondence table 201c-2, respectively, as a transmission path for packet transmission.

Next, the degeneration correspondence table of the data transferring apparatus according to the exemplary first embodiment is explained. FIG. 9 is a drawing of one example of the degeneration correspondence table according to the exemplary first embodiment. In the degeneration correspondence table 101c-2 (201c-2) according to the exemplary first embodiment, a column of "idle segment" is added to the degeneration correspondence table 101c-1 (201c-1). With this, even for segments under degeneration control, a usable segment can be identified. "Idol segment" is a segment separated as an unusable segment although it is usable.

For example, when "drop signal" indicates "1", this means that "width" is "½ degeneration", "width setting signal" is "B", "use segment" is "a, b", "error-occurring segment" is "c", and "idle segment" is "d".

Next, the configuration of the transmission-side multiplexer of the data transferring apparatus according to the exemplary first embodiment and the configuration of a timing selector unit included in the transmission-side multiplexer of the data transferring apparatus according to the exemplary first embodiment are explained.

Figure 10A:
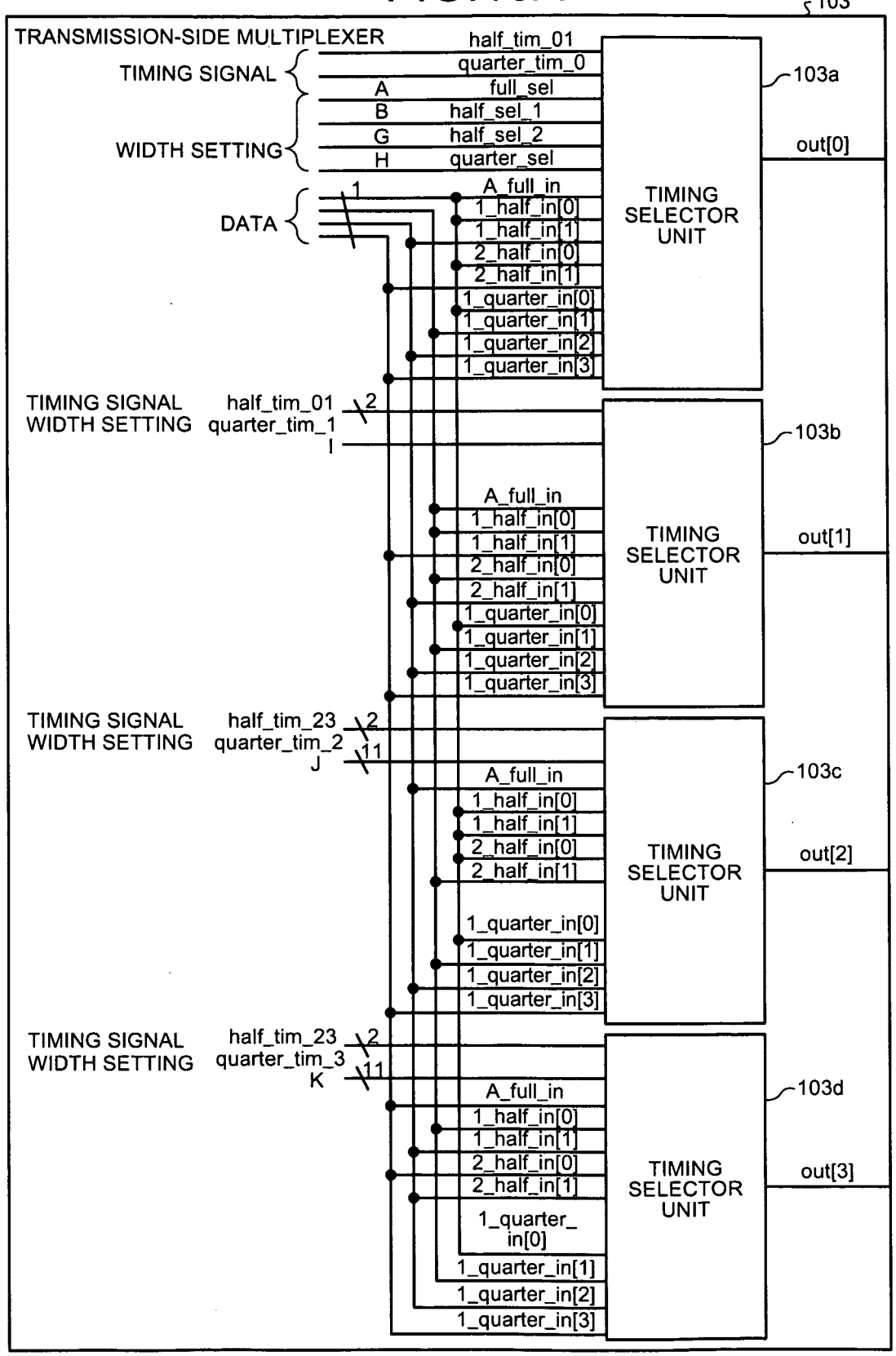
FIG. 10A is a block diagram of the configuration of a transmission-side multiplexer of the data transferring apparatus according to the exemplary first embodiment.
Figure 10B:
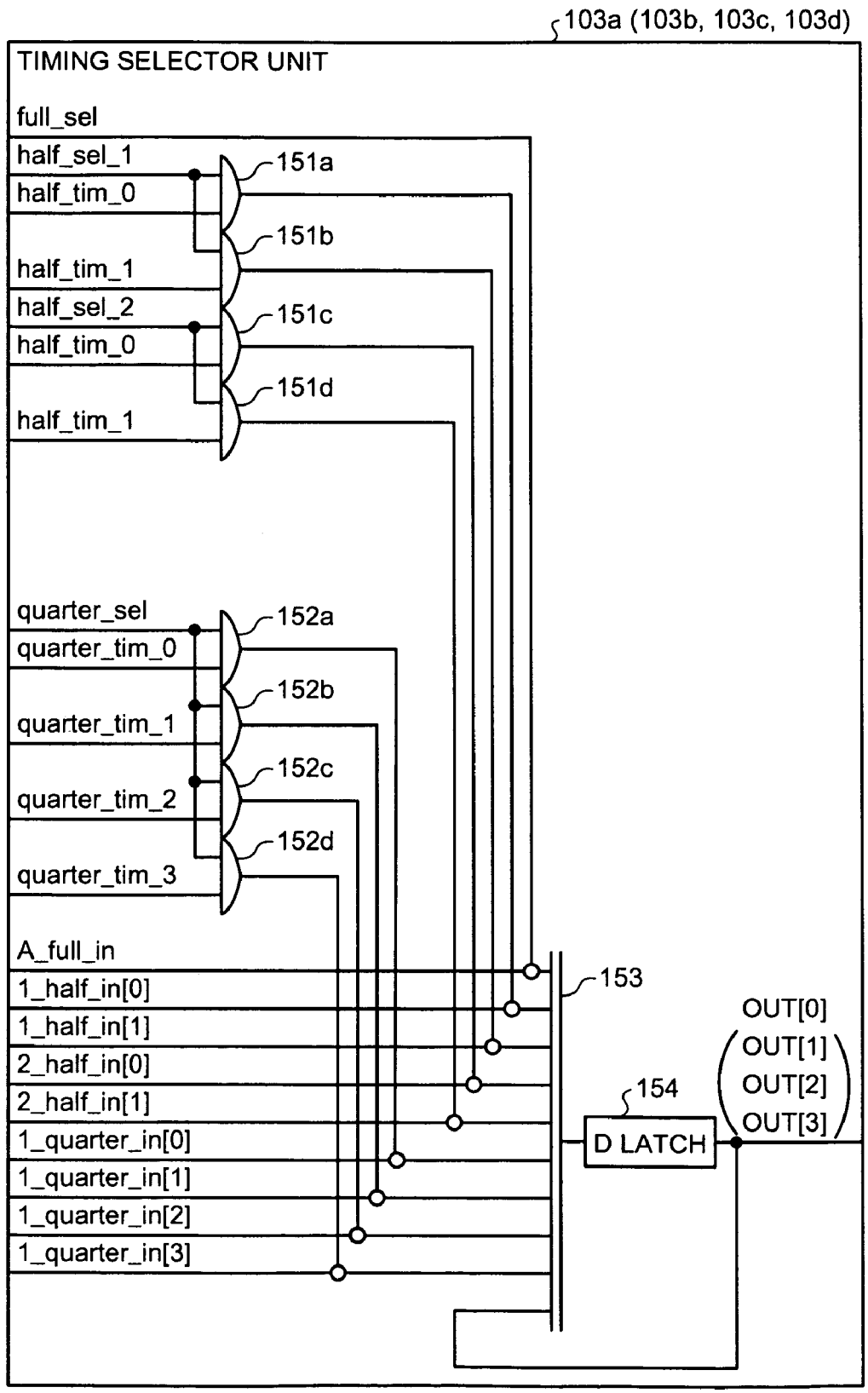
FIG. 10B is a block diagram of the configuration of a timing selector unit included in the transmission-side multiplexer of the data transferring apparatus according to the exemplary first embodiment.

FIG. 10A is a block diagram of the configuration of the transmission-side multiplexer 103 of the data transferring apparatus according to the exemplary first embodiment. FIG. 10B is a block diagram of the configuration of timing selector units 103a to 103d included in the transmission-side multiplexer 103 of the data transferring apparatus according to the exemplary first embodiment.

An initialization circuit 101b-1 outputs to the transmission-side multiplexer 103 the result of selection of a segment to be used by the transmission-side multiplexer 103 and a data-sending-timing signal based on the degeneration setting recorded in the degeneration correspondence register 101c-3. Also, the initialization circuit 101b-1 uses a timing signal and a width signal to notify the data adjusting unit 102 of a data sending timing and a data width according to the operation state of the transmission-side multiplexer 103.

Here, "width setting signal" in the degeneration correspondence table 101c-2 correspond to width setting A to K in the transmission-side multiplexer 103. half_tim_01 and half_tim_23 correspond to "timing signal" 1 and 2 and "timing signal" 3 and 4, respectively, depicted in FIGS. 11A to 11C, which will be explained further below. Also, quarter_tim_0, quarter_tim_1, quarter_tim_2, and quarter_tim_3 correspond to "timing signal" 1 to 4, respectively, depicted in FIGS. 11A to 11C, which will be explained further below.

Here, in the exemplary first embodiment, degeneration of the transmission path is performed by taking adjacent transmission lines as a set, taking the data width as a degeneration unit, and reducing the data width by ½. Therefore, since signals of width setting C to F and H to K regarding ½ degeneration are not set at all, and thus are not input to the transmission-side multiplexer 103.

The timing selector units 103a to 103d of the transmission-side multiplexer 103 output degenerated transmission data based on segment selection information for use by the transmission-side multiplexer 103 and a data-sending-timing signal.

The timing selector units 103a to 103d of the transmission-side multiplexer 103 each have AND gates 151a to 151d that take a product of input signals half_sel_1 and half_tim_0, a product of input signals half_sel_1 and half_tim_1, a product of input signals half_sel_2 and half_tim_0, and a product of input signals half_sel_2 and half_tim_1, respectively.

Also, the timing selector units 103a to 103d of the transmission-side multiplexer 103 each have AND gates 152a to 152d that take a product of input signals quarter_sel and quarter_tim_0, a product of input signals quarter_sel and quarter_tim_1, a product of input signals quarter_sel and quarter_tim_2, and a product of input signals quarter_sel and quarter_tim_3, respectively.

The timing selector units 103a to 103d has a selector 153 that outputs signals obtained by switchably combining inputs to the AND gates 151a to 151d and the AND gates 152a to 152d in a manner as depicted in the drawing. That is, the timing selector units 103a to 103d input the relevant data to the selector 153 at the timings of the AND gates 151a to 151d and the AND gates 152a to 152d.

The timing selector units 103a to 103d each include a Delay latch (D latch) 154 that temporarily accumulates and degenerates data output from the selector 153 to be transmitted at the same timing, until all segments of the data arrive.

When all segments of the data at the same timing do not arrive, the data temporarily accumulated in the D latch 154 is again input to the selector 153, waiting until it is selected by the selector 153 for output to the D latch 154.

Figure 11A:
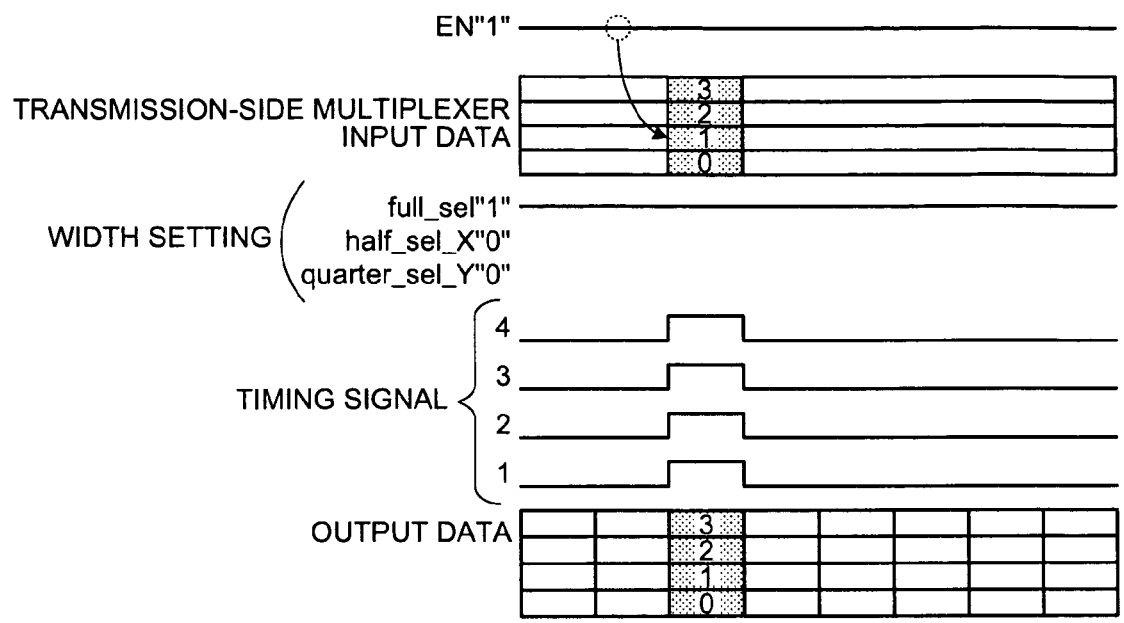
FIG. 11A is a timing chart depicting the operations of a timing generation circuit and the transmission-side multiplexer when a data transmission path has no degeneration in the data transferring apparatus according to the exemplary first embodiment.

FIG. 11A depicts the operations of the timing generation circuit 101d-1 and the transmission-side multiplexer 103 when a data transmission path has no degeneration. FIG. 11B depicts the operations of the timing generation circuit 101d-1 and the transmission-side multiplexer 103 at the time of performing ½ degeneration. FIG. 11C depicts the operations of the timing generation circuit 101d-1 and the transmission-side multiplexer 103 at the time of performing ¼ degeneration.

According to FIG. 11A, since a width setting signal "full_sel" always indicates "1", degeneration of the transmission path is not performed. The data input to the transmission-side multiplexer 103 is output at the same timing as the input timing with the same data width.

Figure 11B:
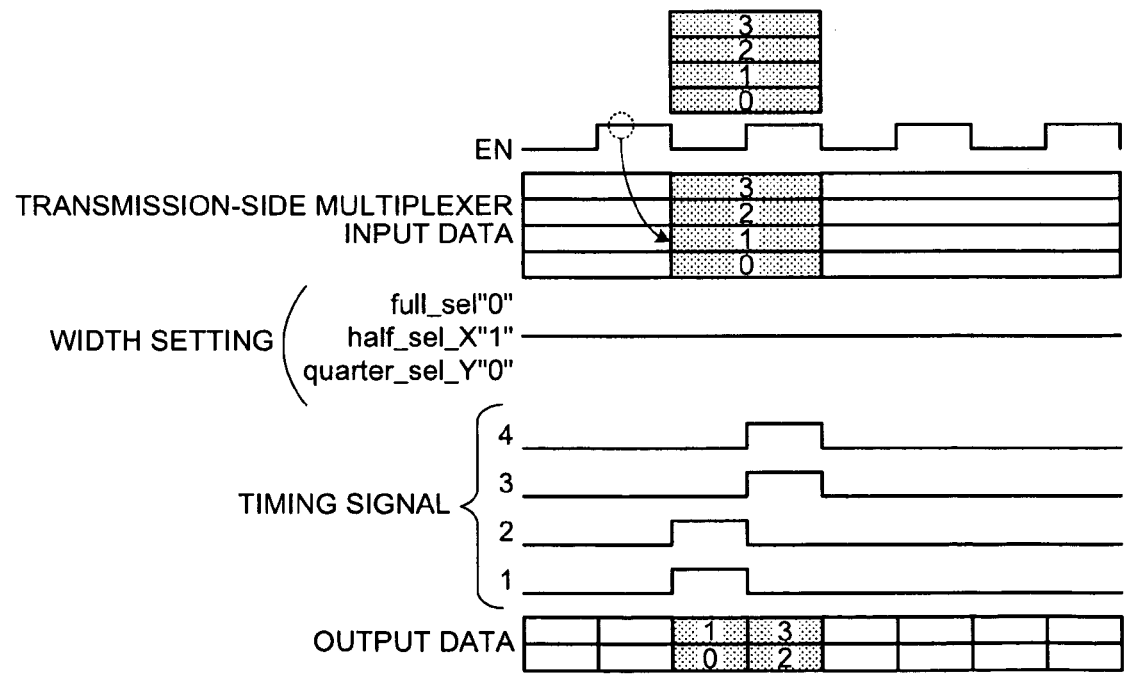
FIG. 11B is a timing chart depicting the operations of the timing generation circuit and the transmission-side multiplexer when the data transmission path is subjected to degeneration (½ degeneration) in the data transferring apparatus according to the exemplary first embodiment.

According to FIG. 11B, since a width setting signal "half_sel_X" (where "X" represents a non-degenerate transmission path) always indicates "1", the transmission path is degenerated to ½. The data input to the transmission-side multiplexer 103 in synchronization with the EN timing is degenerated for output with a ½ data width at the same timing as the input timing and a timing immediately subsequent to the input timing.

Figure 11C:
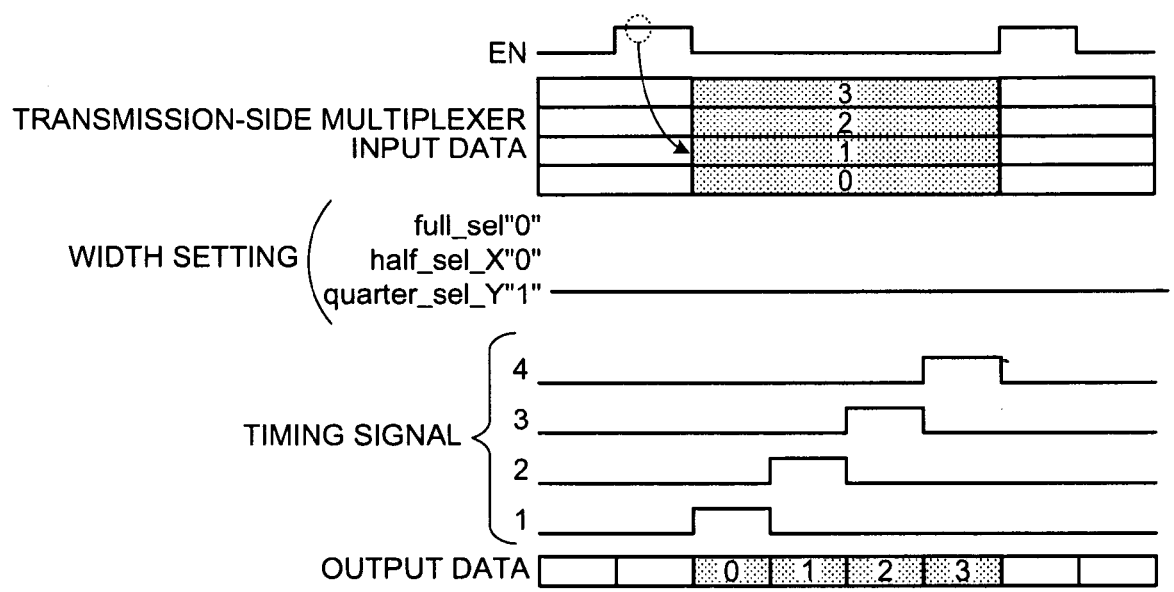
FIG. 11C is a timing chart depicting the operations of the timing generation circuit and the transmission-side multiplexer when the data transmission path is subjected to degeneration (¼ degeneration) in the data transferring apparatus according to the exemplary first embodiment.

According to FIG. 11C, since a width setting signal "quarter_sel_Y" (where "Y" represents a non-degenerate transmission path) always indicates "1", the transmission path is degenerated to ¼. The data input to the transmission-side multiplexer 103 in synchronization with the EN timing is degenerated for output with a ¼ data width at the same timing as the input timing, and a timing immediately subsequent to the input timing, a timing after two timings from the input timing, and a timing after three timing from the input timing.

Next, the configuration of the reception-side first multiplexer of the data transferring apparatus according to the exemplary first embodiment and the configuration of a timing selector unit included in the reception-side first multiplexer of the data transferring apparatus according to the exemplary first embodiment are explained.

Figure 12A:
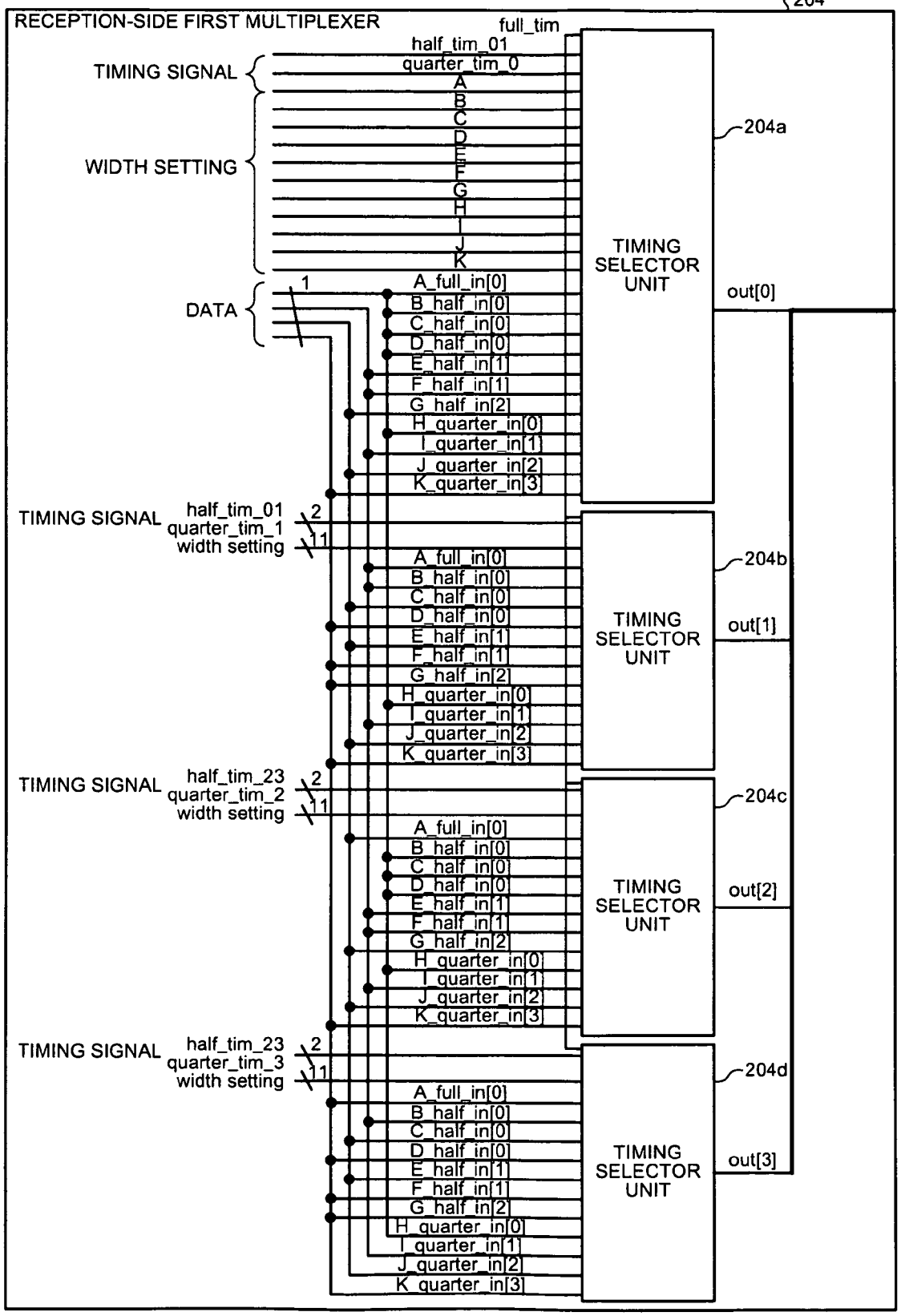
FIG. 12A is a block diagram of the configuration of a reception-side first multiplexer of the data transferring apparatus according to the exemplary first embodiment.
Figure 12B:
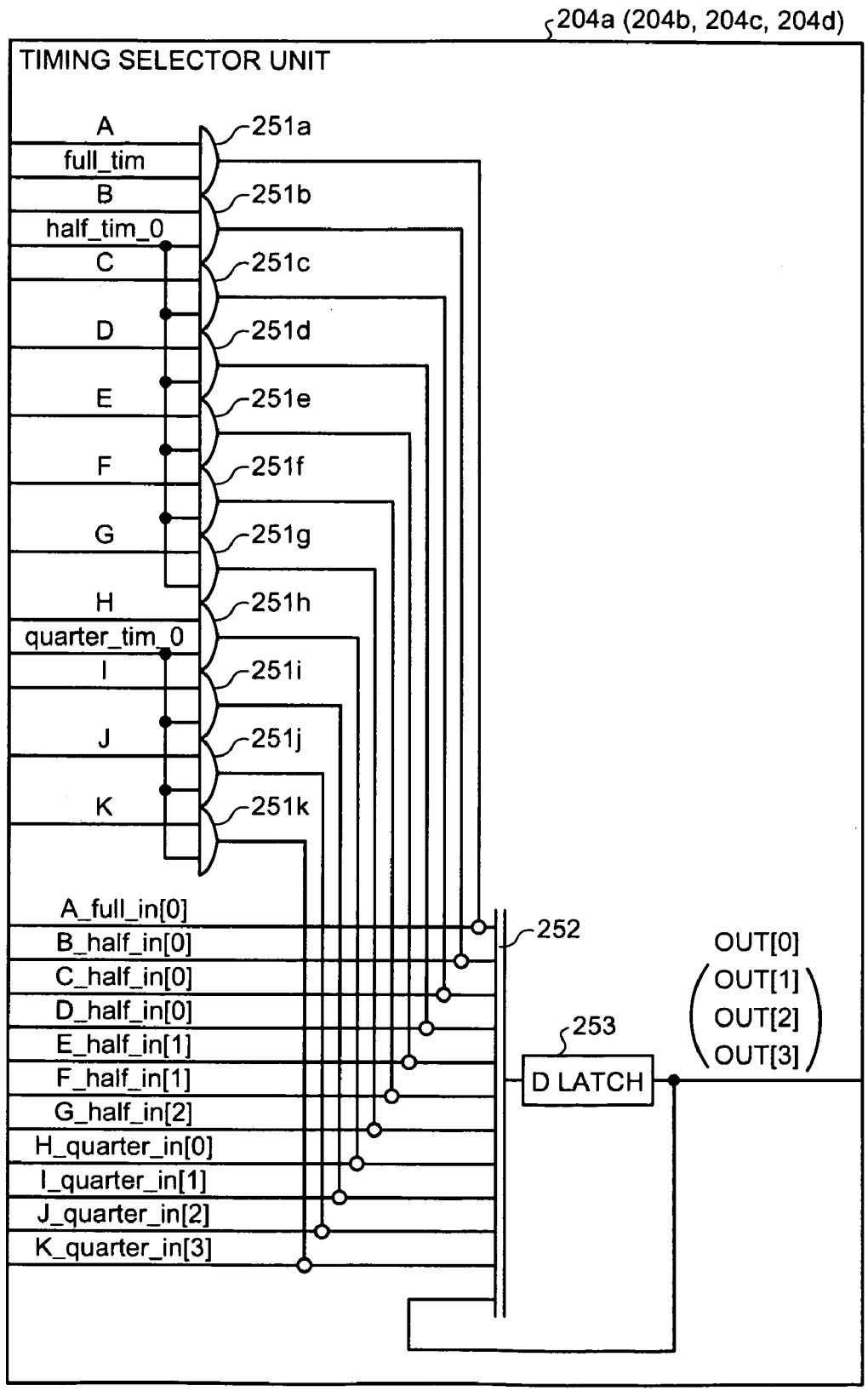
FIG. 12B is a block diagram of the configuration of a timing selector unit included in the reception-side first multiplexer of the data transferring apparatus according to the exemplary first embodiment.

FIG. 12A is a block diagram of the configuration of the reception-side first multiplexer 204 of the data transferring apparatus according to the exemplary first embodiment. FIG. 12B is a block diagram of the configuration of a timing selector unit 204a included in the reception-side first multiplexer 204 of the data transferring apparatus according to the exemplary first embodiment.

With degeneration settings from the initialization circuit 201b-1, the timing generation circuit 201d-1 sends to the reception-side first multiplexer 204 segment selection information for use by the reception-side first multiplexer 204 and a data-sending-timing signal.

Note that the "width setting signal" in the degeneration correspondence table 201c-2 corresponds to width settings A to K in the reception-side first multiplexer 204, and half_tim_01 and half_tim_23 correspond to "timing signal" 1 and 2 and "timing signal" 3 and 4, respectively, depicted in FIGS. 13A to 13C, which will be explained further below.

Also, quarter_tim_0, quarter_tim_1, quarter_tim_2, and quarter_tim_3 correspond to "timing signal" 1 to 4, respectively, depicted in FIGS. 13A to 13C, which will be explained further below.

Based on the segment selection information for use by the reception-side first multiplexer 204 and a data-sending-timing signal, the timing selector units 204a to 204d of the reception-side first multiplexer 204 output the transmission data whose degeneration has been cancelled.

The timing selector units 204a to 204d of the reception-side first multiplexer 204 each include AND gates 251a to 251k that take a product of input signal of width setting A to K, respectively, and one of the full_tim, half_tim_0, and quarter_tim_0 that is relevant to the width setting.

In the exemplary first embodiment, the transmission path is degenerated by taking adjacent transmission lines as a set and using the set as the unit for reducing the data width, thereby reducing the data width by ½. Therefore, since the width setting signals C to F and H to K regarding ½ degeneration are not set at all, and thus are not input to the reception-side first multiplexer 204.

The timing selector units 204a to 204d of the reception-side first multiplexer 204 each include a selector 252 that switches data obtained by combining the inputs to the AND gates 251a to 251k for output and a D latch 253 that temporarily accumulates and degenerates data at the same timing until data of all segments at the same timing arrive.

When all segments of the data at the same timing do not arrive, the data temporarily accumulated in the D latch 253 is again input to the selector 252, waiting until it is selected by the selector 252 for output to the D latch 253.

Figure 13A:
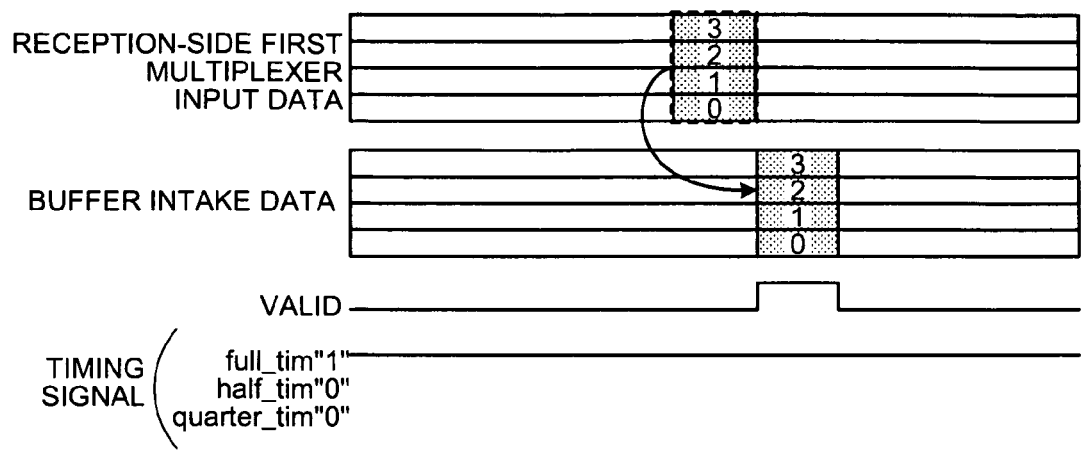
FIG. 13A is a timing chart depicting the operations of the timing generation circuit and the reception-side first multiplexer when a data transmission path has no degeneration in the data transferring apparatus according to the exemplary first embodiment.

FIG. 13A is a timing chart depicting the operations of the timing generation circuit 201b-1 and the reception-side first multiplexer 204 when a data transmission path has no degeneration. FIG. 13B is a timing chart depicting the operations of the timing generation circuit 201b-1 and the reception-side first multiplexer 204 at the time of performing ½ degeneration. FIG. 13C is a timing chart depicting the operations of the timing generation circuit 201b-1 and the reception-side first multiplexer 204 at the time of performing ¼ degeneration.

According to FIG. 13A, since a timing signal "full_tim" always indicates "1", degeneration of the transmission path is not performed. The data input to the reception-side first multiplexer 204 is captured into the buffer 205 at the timing immediately subsequent to the input timing with the same data width.

Figure 13B:
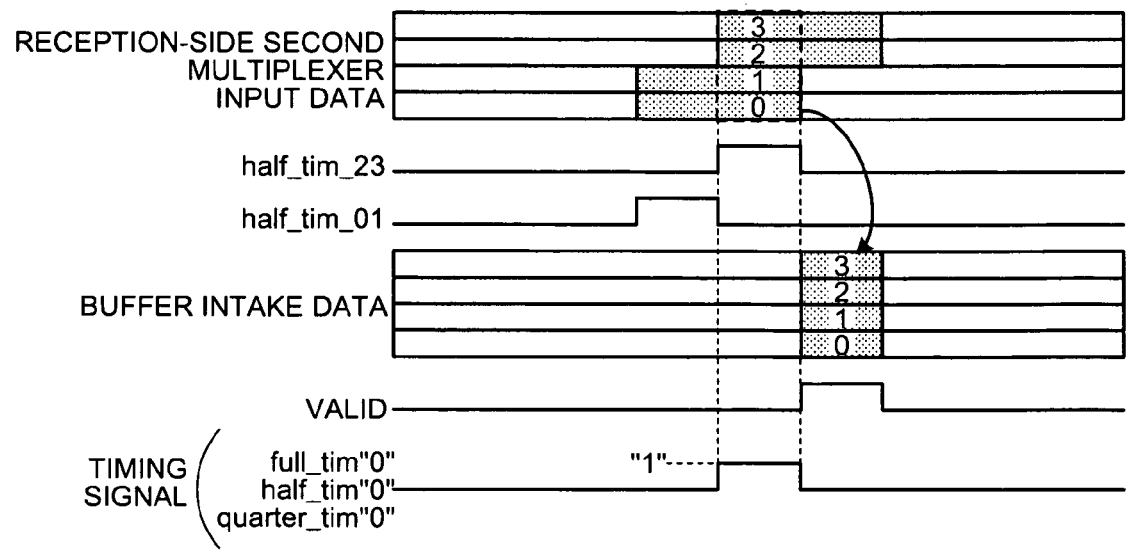
FIG. 13B is a timing chart depicting the operations of the timing generation circuit and the reception-side first multiplexer when the data transmission path is subjected to degeneration (½ degeneration) in the data transferring apparatus according to the exemplary first embodiment.

According to FIG. 13B, the transmission path is degenerated to ½. At the timing where a timing signal "half_tim" becomes "1", degeneration of the data input to the reception-side first multiplexer 204 in synchronization with the Valid timing is cancelled from a ½ data width to the data width before degeneration for output, and is then captured into the buffer 205.

Figure 13C:
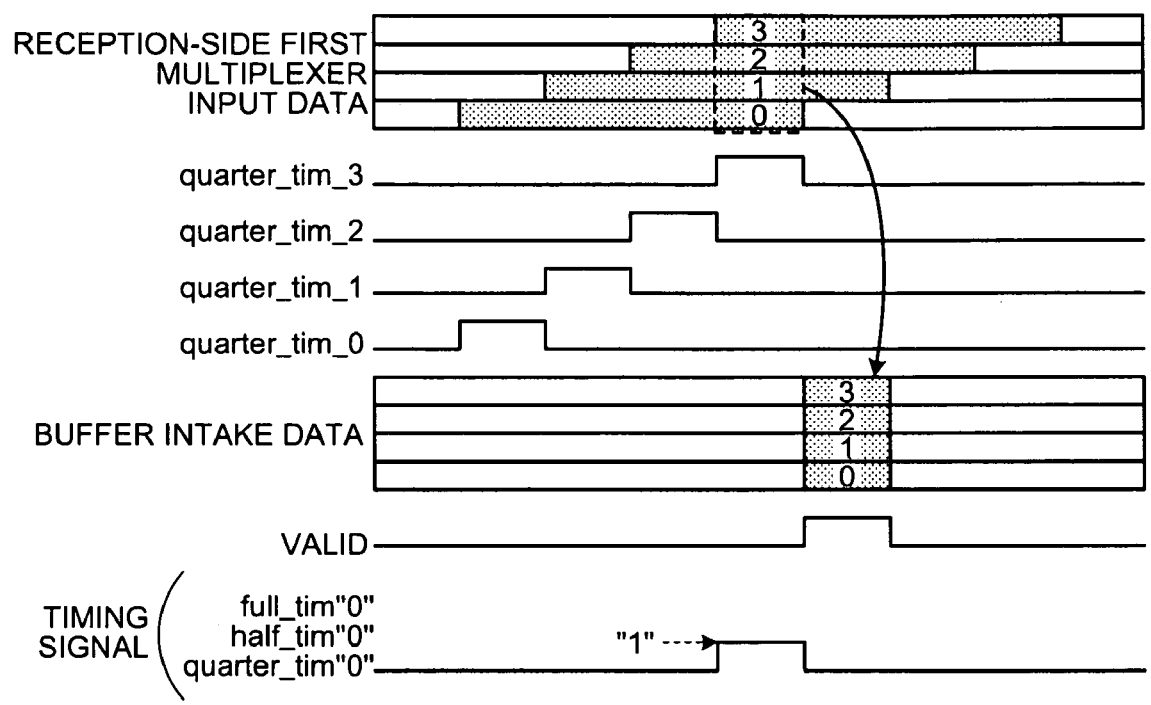
FIG. 13C is a timing chart depicting the operations of the timing generation circuit and the reception-side first multiplexer when the data transmission path is subjected to degeneration (¼ degeneration) in the data transferring apparatus according to the exemplary first embodiment.

According to FIG. 13C, the transmission path is degenerated to ¼. At the timing where a timing signal "quarter_sel" becomes "1", degeneration of the data input to the reception-side first multiplexer 204 in synchronization with the Valid timing is cancelled from a ¼ data width to the data width before degeneration for output. Then, the input data is captured into the buffer 205.

The timing generation circuit 201d-1 outputs a Valid signal depicted in FIGS. 13A to 13C to the buffer 205 connect to a stage after the reception-side first multiplexer 204 so that the data can be captured at the timing when the data of four segments all arrive.

Figure 14:
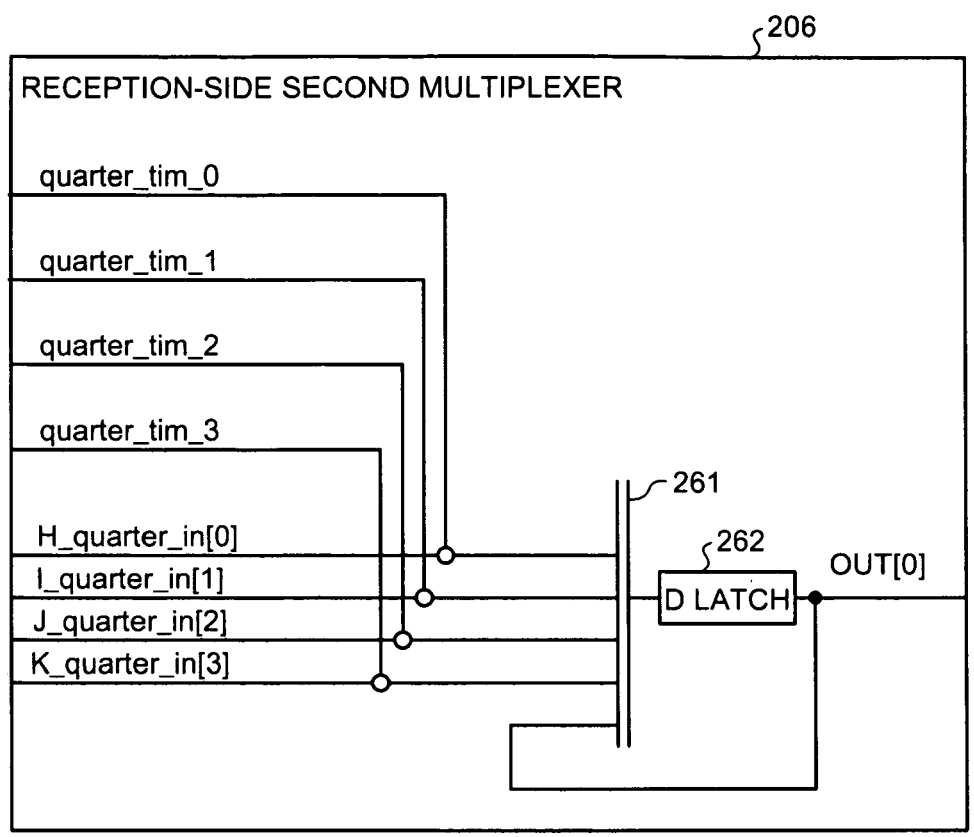
FIG. 14 is a block diagram of the configuration of a reception-side second multiplexer of the data transferring apparatus according to the exemplary first embodiment.

Next, the configuration of the reception-side second multiplexer of the data transferring apparatus according to the exemplary first embodiment is explained. FIG. 14 is a block diagram of the configuration of the reception-side second multiplexer of the data transferring apparatus according to the exemplary first embodiment.

With degeneration settings from the initialization circuit 201b-1, the timing generation circuit 201d-1 sends segment idle information that is not used by the reception-side first multiplexer 204 and indicative of an idle segment and a data-sending-timing signal to the reception-side second multiplexer 206.

As depicted in the drawing, the reception-side second multiplexer 206 has data from any of the error detectors 203a to 203d (H_quarter_in[0], I_quarter_in[1], J_quarter_in[2], K_quarter_in[3]) as an input.

The data (H_quarter_in[0], I_quarter_in[1], J_quarter_in[2], K_quarter_in[3]) is captured with timing signals quarter_tim_0, quarter_tim_1, quarter_tim_2, quarter_tim_3, respectively, and is output by a selector 261 to a D latch 262. The D latch 262 temporarily accumulates data until the data of four segments at the same timing all arrive.

When the data of four segments at the same timing all arrive, the D latch 262 outputs the data to the buffer 207 at the timing of a Valid signal from the timing generation circuit 201-d.

A port of the reception-side second multiplexer 206 for a segment found as idle is open under the control of the timing generation circuit 201d-1 of the managing unit 201-1. The route of the segment found as idle has already been degenerated, and the route of the reception-side first multiplexer 204 cannot be used. A packet transmitted via a bypass route goes via a route of the reception-side second multiplexer 206, and is received by bypassing the reception-side first multiplexer 204.

Figure 15:
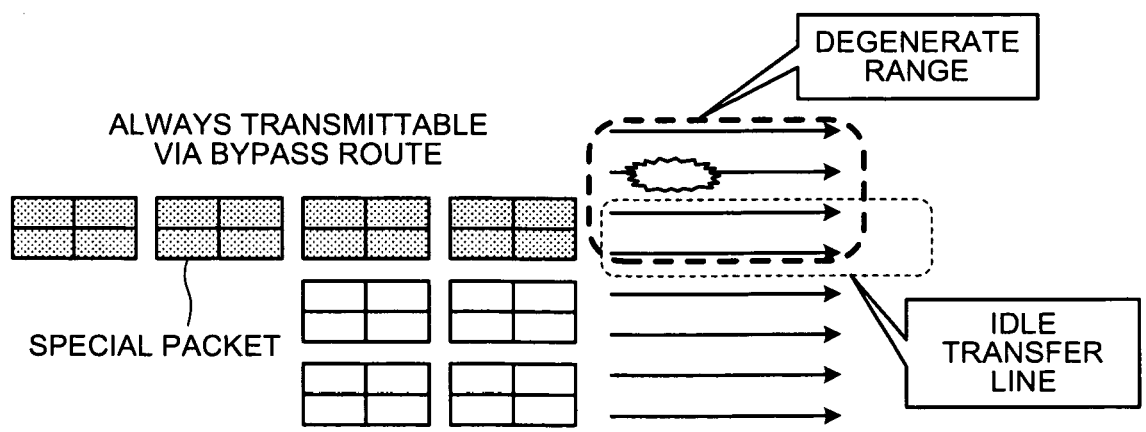
FIG. 15 is a drawing for explaining a bypass transmission state of a packet when a data transmission path has degeneration in the data transferring apparatus according to the exemplary first embodiment.

As depicted in FIG. 15, by effectively utilizing the idle segment, an unwanted stay of a packet is reduced. Furthermore, for example, a special packet with a high priority can always be transmitted, and also can be transmitted and received quickly.

[Exemplary Second Embodiment]

Figure 16:
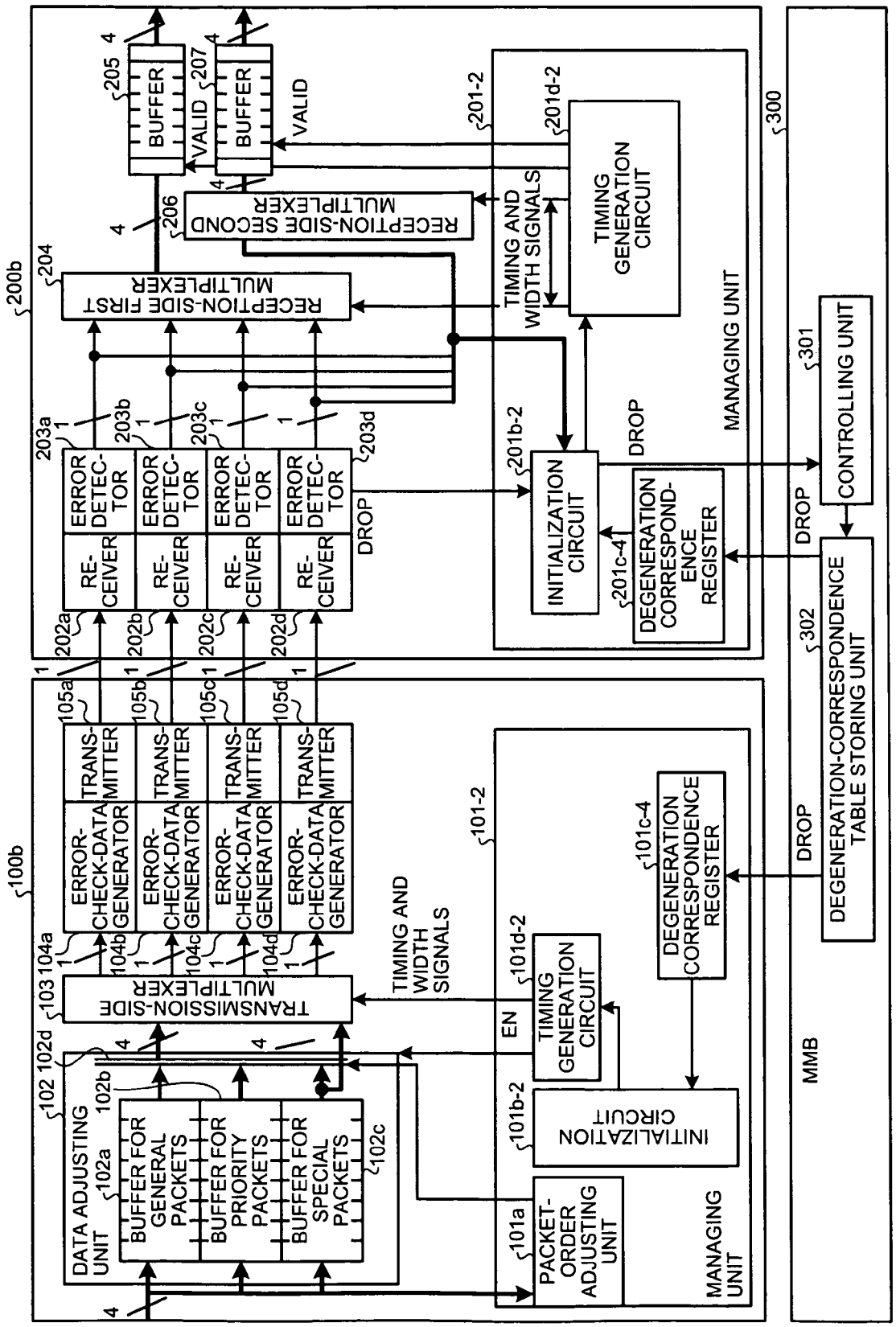
FIG. 16 is a block diagram of the configuration of a data transferring apparatus according to an exemplary second embodiment.

Next, the configuration of a data transferring apparatus according to an exemplary second embodiment is explained. As for the exemplary second embodiment, only the portions different from those in the exemplary first embodiment are explained. FIG. 16 is a block diagram of the configuration of the data transferring apparatus according to the exemplary second embodiment.

In a data transferring apparatus 100b (200b) according to the exemplary second embodiment, in place of the degeneration correspondence table 101c-2 (201c-2), a degeneration recording table 101c-5 (201c-5) that has recorded therein only a correspondence between the relevant degenerate transmission path and an idle segment is stored in a degeneration correspondence register 101c-4 (201c-4) of a managing unit 101-2 (201-2) on transmission and reception side of the conventional data transferring apparatus 100 (200).

Also, the data transferring apparatus 100b (200b) is connected to and managed by a managing apparatus called a Management Board (MMB) 300. Upon receiving from any of the error detectors 203a to 203d a notification indicative of drop, an initialization circuit 201b-2 of the data transferring apparatus 200b notifies a controlling unit 301 of the MMB 300 of drop.

Upon receiving drop from the initialization circuit 201b-2, the controlling unit 301 instructs a degeneration-correspondence-table storing unit 302 to refer to a stored degeneration correspondence table 302a (refer to FIG. 17) to search for an idle segment from a degenerate transmission path.

When finding an idle segment from the degeneration correspondence table 302a, the degeneration-correspondence-table storing unit 302 uses drop to record a correspondence between the degenerate transmission path and the idle segment in the degeneration correspondence tables 101c-2 and 201c-2.

That is, the degeneration correspondence table 302a covering a correspondence between all degeneration transmission path and idle segments is provided to the MMB 300. Then, in the degeneration correspondence registers 101c-5 and 201c-5, as depicted in FIG. 18, only entries (including a drop signal) regarding degenerate transmission paths actually degenerated and idle segments are recorded.

With this, the capacity of the degeneration correspondence register included in each of the data transferring apparatuses 100b and 200b can be made compact, thereby reducing component cost of the data transferring apparatus 100b (200b).

Figure 19:
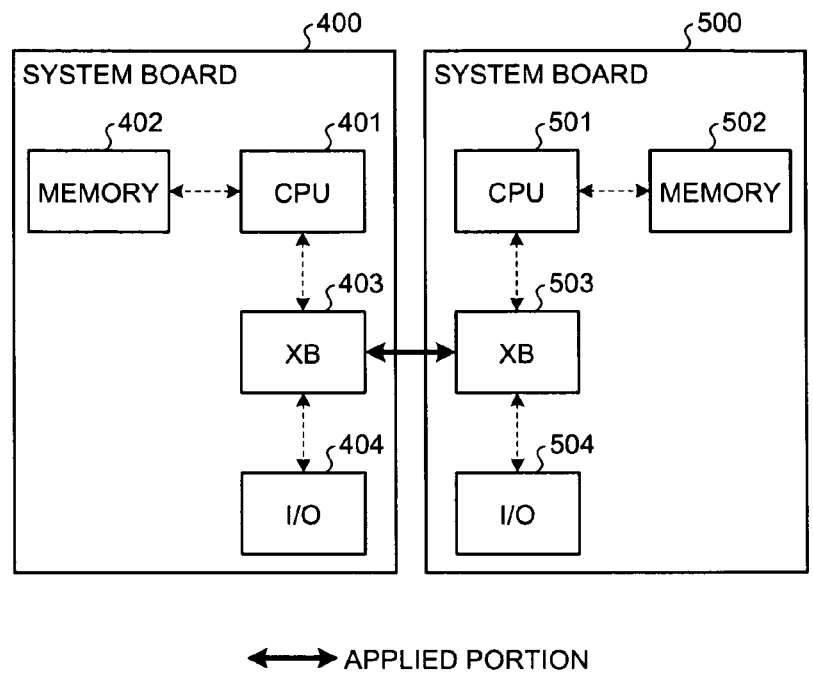
FIG. 19 is a drawing of an application example of the exemplary first and second embodiments.

The data transferring apparatus disclosed in each of the exemplary first and second embodiments can be applied to, for example, as depicted in FIG. 19, data communication performed between a system board 400 including a Central Processing Unit (CPU) 401, a memory 402, a crossbar board (XB) 403, and an Input/Output interface (IO) 404 and a system board 500 including a CPU 501, a memory 502, an XB 503, and an IO 504 via both XBs.

In this manner, the data transferring apparatus disclosed in each of the exemplary first and second embodiments is applied to an information processing apparatus in which a plurality of system boards performs communication via XBs, for example, a parallel computing machine, thereby increasing throughput of the information processing apparatus.

In the exemplary first and second embodiments, transmission is made to the counterpart data transferring apparatus via a degenerated idle transmission path by bypassing the selector 102d of the data adjusting unit 102. In the reception-side data transferring apparatus, the packet transmitted by using a route to the reception-side second multiplexer 206 by bypassing the reception-side first multiplexer 204 is a special packet. However, such a packet is not restricted to a special packet, and can be a priority packet or a general packet.

In the foregoing, while the exemplary first and second embodiments have been explained, the present invention are not meant to be restricted to this, and may be implemented with further various different exemplary embodiments within the technical idea recited in the claims. Also, the effects of the exemplary first and second embodiments are not meant to be restrictive.

Specifically, an error notifying signal drop contains identification information of a segment where a transmission error occurred. Therefore, in the degeneration correspondence table 101c-2 (201c-2), the columns "width", "error-occurring segment", "idle segment", and "transmission state flag" may be omitted.

In this case, when receiving a notification of drop from any of the transmitters 105a to 105d, the initialization circuit 101b-1 immediately refers to the degeneration correspondence table 101c-2 (201c-2) to specify "width setting signal" and "use segment" based on drop. Then, based on the specification result, by using drop and timing and width signals, the initialization circuit 101b immediately instructs the data adjusting unit 102 and the transmission-side multiplexer 103 to perform degeneration control.

With this, the information amount of the degeneration correspondence table 101c-2 (201c-2) can be significantly decreased, thereby saving storage resources of the degeneration correspondence register 101c-3 (201c-3).

Furthermore, among the processes explained in the exemplary first and second embodiments, all or part of the processes explained as being automatically performed may be manually performed or may be automatically performed through a known method.

In addition, the process procedure, the control procedure, specific names, and information including various data and parameters explained in the exemplary first and second embodiments can be arbitrarily changed unless otherwise specified.

Furthermore, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

Still further, all or arbitrary part of the process functions performed in each component can be achieved by a Central Processing Unit (CPU) (or a microcomputer, such as Micro Processing Unit (MPU) or Micro Controller Unit (MCU)) and a program analyzed and executed on that CPU (or microcomputer, such as MPU or MCU), or can be achieved as hardware with a wired logic.

According to the embodiments of the invention, effects can be achieved such that, even if a transmission path is degenerated when a transmission error occurs, a decrease in throughput of the information processing apparatus can be suppressed, and an unwanted stay of transmission data and a delay in transmission of data to be transmitted with the highest priority can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus comprising:
    a data transmitting apparatus that transmits data of an N-bit width, where N is a positive integer greater than or equal to 4;
    a data receiving apparatus that receives the data of the N-bit width from the data transmitting apparatus; and
    a data bus of the N-bit width connecting the data transmitting apparatus and the data receiving apparatus,
    wherein the data transmitting apparatus comprises:
        a first error-detection-code-attached data generation circuit that generates, for first data of an X-bit width, where X is a positive integer greater than or equal to 1 satisfying X<N, from among the data of the N-bit width, first error-detection-code-attached data provided with an error detection code for detecting a data transmission error by the data receiving apparatus;
        a second error-detection-code-attached data generation circuit that generates, for second data of an (N-X)-bit width from among the data of the N-bit width, second error-detection-code-attached data provided with an error detection code for detecting a data transmission error by the data receiving apparatus;
        a first degeneration correspondence register that records therein an error occurring position in the data bus, based on a first or second error notifying signal from the data receiving apparatus; and
        a transmission-side selection circuit that selects either one of a first data bus of an X-bit width and a second data bus of an (N-X)-bit width of the data bus of the N-bit width, based on a data degeneration notifying signal to output the first and second error-detection-code-attached data, and selects either bits of the first and second data buses in another data bus not selected from among the first and second data buses, based on a usable bit position notifying signal based on recorded contents of the first degeneration correspondence register to output third data different from the first and second error-detection-code-attached data, and
    wherein the data receiving apparatus comprises:
        a first error checking circuit that detects an error in the first errordetection-code-attached data and outputs the first error notifying signal when having detected an error;
        a second error checking circuit that detects an error in the second errordetection-code-attached data and outputs the second error notifying signal when having detected the error; and
        a second degeneration correspondence register that records therein an error occurring position in the data of the N-bit width based on the first or second error notifying signal.

2. The information processing apparatus according to claim 1, wherein
    the data transmitting apparatus and the data receiving apparatus each include a control circuit that controls the respective apparatuses,
    the data receiving apparatus includes a reception-side selection circuit that selects and outputs the third data received from the data transmitting apparatus,
    the control circuit of the data receiving apparatus causes the error occurring position in the data of the N-bit width to be recorded in the second degeneration correspondence register based on the first or second error notifying signal input from the first or second error checking circuit, outputs the data degeneration notifying signal to the reception-side selection circuit, and outputs the first or second error notifying signal to the control circuit of the data transmitting apparatus, and
    the control circuit of the data transmitting apparatus causes an error occurring position in the data bus to be recorded in the first degeneration correspondence register based on the first or second error notifying signal input from the control circuit of the data receiving apparatus, and outputs the data degeneration notifying signal to the transmission-side selection circuit.

3. The information processing apparatus according to claim 1, further comprising a managing apparatus that is connected to the data transmitting apparatus and the data receiving apparatus and includes a degeneration correspondence table for recording the error occurring position in the data of the N-bit width based on the first or second error notifying signal, wherein
    the managing apparatus notifies the data transmitting apparatus and the data receiving apparatus of the first or second error notifying signal from the data receiving apparatus and causes the error occurring position in the data bus to be recorded in the second degeneration correspondence register, and
    the data transmitting apparatus causes the error occurring position in the data bus to be recorded in the first degeneration correspondence register based on notification of the first or second error notifying signal from the managing apparatus.

4. The information processing apparatus according to claim 3, wherein the managing apparatus outputs the first and second error notifying signals to the data transmitting apparatus and the data receiving apparatus and, based on the error occurring position recorded in the first and second degeneration correspondence registers, outputs the data degeneration notifying signal and the usable bit position notifying signal to the data transmitting apparatus and the data receiving apparatus.

5. The information processing apparatus according to claim 1, wherein the X is N/2.

6. A data transferring apparatus that transmits, via a data bus of an N-bit width, where N is a positive integer greater than or equal to 4, data of the N-bit width to a counterpart data receiving apparatus, the data transferring apparatus comprising:
- a first error-detection-code-attached data generation circuit that generates, for first data of an X-bit width, where X is a positive integer greater than or equal to 1 satisfying X<N, from among the data of the N-bit width, first error-detection-code-attached data provided with an error detection code for detecting a data transmission error by the data receiving apparatus;
- a second error-detection-code-attached data generation circuit that generates, for second data of an (N-X)-bit width from among the data of the N-bit width, second error-detection-code-attached data provided with an error detection code for detecting a data transmission error by the data receiving apparatus;
- a first degeneration correspondence register that records therein an error occurring position in the data bus based on a first or second error notifying signal from the data receiving apparatus; and
- a transmission-side selection circuit that selects either one of a first data bus of an X-bit width and a second data bus of an (N-X)-bit width of the data bus of the N-bit width, based on a data degeneration notifying signal to output the first and second error-detection-code-attached data, and selects either bits of the first and second data buses in another data bus not selected from among the first and second data buses, based on a usable bit position notifying signal based on recorded contents of the first degeneration correspondence register to output third data different from the first and second error-detection-code-attached data.

7. The data transferring apparatus according to claim 6, further comprising a control circuit that causes in the error occurring position in the data bus to be recorded in the first degeneration correspondence register based on the first or second error notifying signal from the control circuit of the counterpart data receiving apparatus, and outputs the data degeneration notifying signal to the transmission-side selection circuit.

8. The data transferring apparatus according to claim 6, wherein the X is N/2.

9. A data transferring apparatus that transmits, via a data bus of an N-bit width, where N is a positive integer greater than or equal to 4, data of the N-bit width to a counterpart data receiving apparatus, the data transferring apparatus comprising:
- a first error-detection-code-attached data generation circuit that generates, for first data of an X-bit width, where X is a positive integer greater than or equal to 1 satisfying X<N, from among the data of the N-bit width, first error-detection-code-attached data provided with an error detection code for detecting a data transmission error by the data receiving apparatus;
- a second error-detection-code-attached data generation circuit that generates, for second data of an (N-X)-bit width from among the data of the N-bit width, second error-detection-code-attached data provided with an error detection code for detecting a data transmission error by the data receiving apparatus;
- a first degeneration correspondence register that records therein an error occurring position in the data bus, based on a first or second error notifying signal from a managing apparatus; and
- a transmission-side selection circuit that selects either one of a first data bus of an X-bit width and a second data bus of an (N-X)-bit width of the data bus of the N-bit width, based on a data degeneration notifying signal to output the first and second error-detection-code-attached data, and selects either bits of the first and second data buses in another data bus not selected from among the first and second data buses, based on a usable bit position notifying signal based on recorded contents of the first degeneration correspondence register to output third data different from the first and second error-detection-code-attached data.

10. The data transferring apparatus according to claim 9, further comprising a control circuit that records the error occurring position in the data bus in the first degeneration correspondence register, based on the first or second error notifying signal from the managing apparatus, and outputs the data degeneration notifying signal to the transmission-side selection circuit.

11. The data transferring apparatus according to claim 9, wherein the X is N/2.

12. A data transferring apparatus that receives, via a data bus of an N-bit width, where N is a positive integer, data of the N-bit width from a counterpart data transmitting apparatus, the data transferring apparatus comprising:
- a first error checking circuit that detects an error in a first error-detection-code-attached data received from the data transmitting apparatus and outputs a first error notifying signal when having detected an error;
- a second error checking circuit that detects an error in a second error-detection-code-attached data received from the data transmitting apparatus and outputs a second error notifying signal when having detected an error; and
- a second degeneration correspondence register that records therein an error occurring position in the data of the N-bit width, based on the first or second error notifying signal.

13. The data transferring apparatus according to claim 12, further comprising:
- a reception-side selection circuit that selects and outputs third data that is received from the counterpart data transmitting apparatus and is different from the first and second error-detection-code-attached data; and
- a control circuit that causes the error occurring position in the data of the N-bit width to be recorded in the second degeneration correspondence register based on the first or second error notifying signal input from the first or second error checking circuit, outputs a data degeneration notifying signal to the reception-side selection circuit, and outputs the first or second error notifying signal input from the first or second error checking circuit to a control circuit of the counterpart data transmitting apparatus.

14. A data transferring apparatus that receives, via a data bus of an N-bit width, where N is a positive integer greater than or equal to 4, data of the N-bit width from a counterpart data transmitting apparatus, the data transferring apparatus comprising:

a first error checking circuit that detects an error in a first error-detection-code-attached data received from the data transmitting apparatus and outputs a first error notifying signal when having detected an error;

a second error checking circuit that detects an error in a second error-detection-code-attached data received from the data transmitting apparatus and outputs a second error notifying signal to a managing apparatus when having detected an error; and a second degeneration correspondence register that records therein an error occurring position in the data of the N-bit width, based on the first or second error notifying signal from the managing apparatus.

15. The data transferring apparatus according to claim 14, further comprising:

a reception-side selection circuit that selects and outputs third data that is received from the counterpart data transmitting apparatus and is different from the first and second error-detection-code-attached data; and a control circuit that records the error occurring position in the data of the N-bit width in the second degeneration correspondence register, based on the first or second error notifying signal input from the managing apparatus, outputs the data degeneration notifying signal to the reception-side selection circuit, and outputs the first or second error notifying signal input from the first or second error checking circuit to a control circuit of the counterpart data transmitting apparatus.

16. A method of transferring data in an information processing apparatus including a data transmitting apparatus that transmits data of an N-bit width, where N is a positive integer greater than or equal to 4, a data receiving apparatus that receives the data of the N-bit width from the data transmitting apparatus, and a data bus of the N-bit width connecting the data transmitting apparatus and the data receiving apparatus, the method comprising:

generating, for first data of an X-bit width, where X is a positive integer greater than or equal to 1 satisfying X<N, from among the data of the N-bit width, first errordetection-code-attached data provided with an error detection code for detecting a data transmission error by the data receiving apparatus;

generating, for second data of an (N-X)-bit width from among the data of the N-bit width, second error-detection-code-attached data provided with an error detection code for detecting a data transmission error by the data receiving apparatus;

recording therein an error occurring position in the data bus, based on a first or second error notifying signal from the data receiving apparatus; and selecting either one of a first data bus of an X-bit width and a second data bus of an (N-X)-bit width of the data bus of the N-bit width, based on a data degeneration notifying signal to output the first and second error-detection-code-attached data, and selects either bits of the first and second data buses in another data bus not selected from among the first and second data buses, based on a usable bit position notifying signal based on recorded contents of recording the error occurring position to output third data different from the first and second error-detection-code-attached data;

detecting an error in the first error-detection-code-attached data and outputs the first error notifying signal when having detected an error;

detecting an error in the second error-detection-code-attached data and outputs the second error notifying signal when having detected the error; and recording therein an error occurring position in the data of the N-bit width based on the first or second error notifying signal.

* * * * *

UNITED STATES PATENT AND TRADEMARK OFFICE
CERTIFICATE OF CORRECTION

PATENT NO. : 8,356,240 B2
APPLICATION NO. : 12/382298
DATED : January 15, 2013
INVENTOR(S) : Kazuya Takaku It is certified that error appears in the above-identified patent and that said Letters Patent is hereby corrected as shown below:

On the Title Page, Item [54] and in the Specification, Column 1, Line 1, Title, delete "TRANSFERING" and insert -- TRANSFERRING --, therefor In the Claims
Column 16, Line 13, In Claim 1, delete "errordetection-code-attached" and insert -- error-detection-code-attached --, therefor.
Column 16, Line 17, In Claim 1, delete "errordetection-code-attached" and insert -- error-detection-code-attached --, therefor.
Column 17, Line 19, In Claim 6, delete "1satisfying" and insert -- 1 satisfying --, therefor.
Column 17, Line 63, In Claim 9, delete "1satisfying" and insert -- 1 satisfying --, therefor.
Column 20, Line 7, In Claim 16, delete "errordetection-code-attached" and insert -- error-detection-code-attached --, therefor.

Signed and Sealed this
Fourth Day of June, 2013

Teresa Stanek Rea
*Acting Director of the United States Patent and Trademark Office*